US005760105A

United States Patent [19]

Okada et al.

[11] Patent Number: 5,760,105
[45] Date of Patent: Jun. 2, 1998

[54] STYRENIC RESIN COMPOSITION

[75] Inventors: Akihiko Okada; Hiroki Fukui, both of Ichihara, Japan

[73] Assignee: Idemitsu Kosan Co., Ltd., Tokyo, Japan

[21] Appl. No.: 603,262

[22] Filed: Feb. 20, 1996

Related U.S. Application Data

[63] Continuation-in-part of Ser. No. 253,349, Jun. 3, 1994, abandoned.

[30] Foreign Application Priority Data

Jun. 4, 1993 [JP] Japan ................. 5-134259
Jun. 4, 1993 [JP] Japan ................. 5-134261

[51] Int. Cl.$^6$ .............. C08F 279/00; C08L 25/06; C08L 67/00; C08L 71/12
[52] U.S. Cl. ............... 523/201; 524/504; 524/505; 524/508; 524/577; 525/64; 525/66; 525/67; 525/68; 525/71; 525/87; 525/98; 525/133; 525/166; 525/177; 525/179; 525/184; 525/902
[58] Field of Search ............. 523/201; 524/508, 524/577, 504, 505; 525/64, 66, 67, 68, 71, 87, 98, 133, 166, 177, 179, 184, 902

[56] References Cited

U.S. PATENT DOCUMENTS

| 5,270,353 | 12/1993 | Nakano et al. | 525/66 |
| 5,326,813 | 7/1994 | Okada et al. | 524/577 |
| 5,352,727 | 10/1994 | Okada | 524/495 |
| 5,391,611 | 2/1995 | Funayama et al. | 525/68 |
| 5,412,024 | 5/1995 | Okada et al. | 524/577 |
| 5,418,275 | 5/1995 | Okada et al. | 524/577 |
| 5,436,397 | 7/1995 | Okada | 524/494 |
| 5,444,126 | 8/1995 | Okada et al. | 525/391 |
| 5,543,462 | 8/1996 | Okada et al. | 525/74 |

*Primary Examiner*—Peter A. Szekely
*Attorney, Agent, or Firm*—Oblon, Spivak, McClelland, Maier & Neustadt, P.C.

[57] ABSTRACT

There are disclosed a styrenic resin composition which comprises 1 to 95% by weight of a (a) styrenic polymer having syndiotactic configuration (SPS) or modified SPS; 1 to 95% by weight of a (b) thermoplastic resin having a polar group; 1 to 50% by weight of a (c) rubbery elastomer having an affinity for the component (a); and 0.1 to 10% by weight of a (d) compatibilizer having a polar group, a styrenic resin composition same as above except that the component (c) has a polar group capable of reacting with the component (b) as well as an affinity for the component (a) and a styrenic resin composition further comprising 1 to 350% parts by weight of an (e) inorganic filler based on 100 parts by weight of the above resin components. According to the present invention, there are obtained styrenic resin compositions that are well suited for various industrial materials and excellent in rigidity, heat resistance, impact resistance and water resistance.

22 Claims, No Drawings

STYRENIC RESIN COMPOSITION

CROSS-REFERENCE TO RELATED APPLICATIONS

This application is a Continuation-in-Part of application Ser. No. 08/253,349 filed Jun. 3, 1994, now abandoned.

BACKGROUND OF THE INVENTION

1. Field of the Invention

The present invention relates to a novel styrenic resin composition. More particularly, it pertains to a syndiotactic styrenic resin composition which has excellent rigidity, heat resistance, impact resistance, water resistance, etc. and is preferably used as raw materials for industrial materials such as electric and/or electronic materials, industrial construction materials, automobile parts, domestic electrial appliances, various mechanical parts and the like.

2. Description of Related Arts

A styrenic polymer having syndiotactic configuration (hereinafter sometimes abbreviated to "SPS") exhibits excellent heat resistance, chemical resistance, water resistance and acid-alkali resistance, but is poor in impact resistance and therefore, it has heretofore been limited in the scope of its application as a construction material. On the other hand, a polymer having a polar group such as a polyamide absorbs significant amounts of water and its physical properties change when water is absorbed. Further, its physical properties markedly deteriorate upon treatment with acid or alkali in spite of its excellent moldability and heat resistance. Therefore, such styrenic polymers are eagerly desired.

In order to solve such a problem, there has heretofore been proposed alloying of SPS and polymide. (Refer to Japanese Patent Application Laid-Open No. 25795/1987). However, since the dynamic properties of a composition comprising inherently incompatible resins such as SPS with polyamide inevitably suffer deterioration in their dynamic properties because of its poor dispersibility and insufficiency in interfacial strength between the phases, there is a limit to the improving effect resulting from simple blending of the polymer components.

In addition in order to improve dispersibility and interfacial strength, a compatibilizer has been proposed or a compatibilizer which also serves as a rubbery elastomer, for example, styrene/polyamide block copolymer (Japanese Patent Application Laid-Open No. 279944/1989), styrene/glycidyl methacrylate copolymer, styrene/maleic anhydride copolymer (Japanese patent Application Laid-Open No. 209938/1990), maleic anhydride/modified styrene block copolymer rubber (Japanese Patent Application Laid-Open No. 219843/1990), maleic anhydride-modified polyphenylene ether (Japanese Patent Application Laid-Open No. 126744/1991), maleic anhydride-modified SPS (Japanese Patent Application Laid-Open No. 269893/1992) and the like. Nevertheless, it cannot be said in any of the above-mentioned cases, that improvement is sufficient in terms of dynamic properties and the balance between dynamic properties and heat resistance.

SUMMARY OF THE INVENTION

Under such circumstances the present invention was performed for the purpose of providing a syndiotactic styrenic resin composition which has excellent rigidity, heat resistance, impact resistance, water resistance, etc., and is preferably used as raw materials for various industrial materials.

Intensive research and investigation on the part of the present inventors has led to the development of a syndiotactic styrenic resin composition having excellent rigidity, heat resistance, impact resistance, water resistance, etc. As a result, it has been round that a composition comprising SPS, a thermoplastic resin having a reactive polar group, a specific rubbery elastomer and a specific compatibilizer in a specific proportion; or a composition comprising a modified SPS, a thermoplastic resin having a reactive polar group, a specific rubbery elastomer and optionally a compatibilizer in a specific proportion; or a composition further comprising an inorganic filler in addition to the aforesaid components in a specific proportion has characteristics such as excellent rigidity, heat resistance, impact resistance and water resistance. The present invention has been accomplished on the basis of the above-mentioned finding and information.

Specifically the present invention provides (1) a styrenic resin composition which comprises 1 to 95% by weight of a (a-1) styrenic polymer having syndiotactic configuration; 1 to 95% by weight of a (b) thermoplastic resin having a reactive polar group; 1 to 50% by weight of a (c-1) rubbery elastomer having an affinity for said component (a-1); and 0.1 to 10% by weight of a (d-1) compatibilizer which has compatibility with said component (a-1) and a polar group capable of reacting with said component (b), (2) a styrenic resin composition which comprises 1 to 95% by weight of a (a-2) modified styrenic polymer which has syndiotactic configuration and a polar group capable of reacting with said component (b); 1 to 95% by weight of a (b) thermoplastic resin having a reactive polar group; and 1 to 50% by weight of (c-2) rubbery elastomer having an affinity for said component (a-2), (3) a styrenic resin composition which comprises 1 to 95% by weight of said component (a-2); 1 to 95% by weight of the component (b); 1 to 50% by weight of the component (c-2); and 0.1 to 10% by weight of a (d-2) compatibilizer which has compatibility with said component (a-2) and a polar (group capable of reacting with the component (b), (4) a styrenic resin composition which comprises 1 to 95% by weight of a (a-1) styrenic polymer having syndiotactic configuration; 1 to 95% by weight of a (b) thermoplastic resin having a reactive polar group; 1 to 50% by weight of a (c-3) rubbery elastomer which has a polar group capable of reacting with said component (b) and also has an affinity for said component (a-1); and 0.1 to 10% by weight of a (d-1) compatibilizer which has compatibility with said component (a-1) and a polar group capable of reacting with said component (b), (5) a styrenic resin composition which comprises 1 to 95% by weight of a (a-2) modified styrenic polymer which has syndiotactic configuration and a polar group capable of reacting with said component (b); 1 to 95% by weight of a (b) thermoplastic resin having a reactive polar group; 1 to 50% by weight of (c-4) rubbery elastomer which has a polar group capable of reacting with said component (b) and an affinity for said component (a-2); and (6) a styrenic resin composition which comprises 1 to 95% by weight of a (a-2) modified styrenic polymer which has syndiotactic configuration and a polar group capable of reacting with said component (b); 1 to 95% by weight of a (b) thermoplastic resin having a reactive polar group; and 1 to 50% by weight of (c-4) rubbery elastomer which has a polar group capable of reacting with said component (b) and compatibility with said component (a-2); and 0.1 to 10% by weight of a (d-2) compatibilizer which has compatibility with said component (a-2) and a polar group capable of reacting with the component (b).

The present invention further provides a styrenic resin composition which further comprises 1 to 350 parts by weight of an inorganic filler in addition to 100 parts by weight of any one of the above-mentioned resin compositions (1) to (6).

DESCRIPTION OF PREFERRED EMBODIMENT

There is employed in the resin compositions in the first (1) and the fourth (4) aspects of the present invention, a styrenic polymer having syndiotactic configuration, respectively as the component (a-1). Here, the syndiotactic configuration in a styrenic polymer having syndiotactic configuration means that its stereostructure is of syndiotactic configuration, i.e. the stereostructure in which phenyl groups or substituted phenyl group as side chains are located alternately at opposite directions relative to the main chain consisting of carbon-carbon bonds. Tacticity is quantitatively determind by the nuclear magnetic method ($^{13}$C-NMR method) using carbon isotope. The tacticity as determind by the $^{13}$C-NMR method can be indicated in terms of proportions of structural units continuously connected to each other, i.e., a diad in which two structural units are connected to each other, a triad in which three structural units are connected to each other and a pentad in which five structural units are connected to each other. "The styrenic polymers having such syndiotactic configuration as mentioned in the present invention usually means polystyrene, poly(alkylstyrene), poly(halogenated styrene), poly(halogenated alkylstyrene), poly(alkoxystyrene), poly(vinyl benzoate), hydrogenated polymer thereof, the mixture thereof, and copolymers containing the above polymers as main components, having such a syndiotacticity as determined by the above-mentioned method that the proportion of racemic diad is at least 75%, preferably at least 85%, or the proportion of racemic pentad is at least 30%, preferably at least 50%. The poly(alkylstyrene) includes poly(methylstyrene), poly (ethylstyrene), poly(isopropylstyrene), poly(tert-butylstyrene), poly(phenylstyrene), poly(vinylnaphthalene) and poly(vinylstyrene). Poly(halogenated styrene) includes poly(chlorostyrene), poly(bromostyrene), and poly (fluorostyrene). Poly(halogenated alkylstyrene) includes poly(chloromethylstylstyrene). Poly(alkoxystyrene) includes poly(methoxystyrene), and poly(ethoxystyrene).

The particularly desirable styrenic polymers are polystyrene, poly(p-methylstyrene), poly(m-methylstyrene), poly(p-tert-butylstyrene), poly(p-chlorostyrene), poly(m-chlorostyrene), poly(p-fluorostyrene), hydrogenated polystyrene and the copolymer containing the structural units thereof.

The above-mentioned styrenic polymer may be used alone or in combination with at least one other one.

The molecular weight of the styrene polymer to be used in the present invention is not specifically limited, but is desirably 10,000 or more, more desirably 50,000 or more in terms of weight-average molecular weight. The molecular-weight distribution, that is, the broadening of molecular weight of the styrenic polymer is not specifically limited as well, but may be in a wide range. A weight-average molecular weight of less than 10,000 is unfavorable since the composition or molding obtained is deteriorated thereby in the thermal and dynamic properties.

The styrenic polymer having such syndiotactic configuration can be produced by polymerizing a styrenic monomer which corresponds to the above styrenic polymer in the presence or absence of a solvent such as an inert hydrocarbon by the use of a catalyst comprising a titanium compound and a condensation product of water and trialkylaluminum (Japanese Patent Application Laid-Open No. 187708/1987).

In addition, the poly(halogenated alkylstyrene) and the hydrogenated product thereof can be produced by the processes described in Japanese Patent Application Laid-Open Nos. 46912/1989 and 178505/1989, respectively. There is employed in each of the resin compositions in the second (2), third (3), fifth (5) and sixth (6) aspects of the present invention, a modified SPS which has a polar group capable of reacting with the component (b) as described hereinbefore. Said modified SPS can be obtained, for example, by modifying the SPS as shown in the aforesaid component (a-1) by the use of a modifying agent, but is not limited to the method provided that it is usable for the purpose of the present invention.

The SPS to be used for the modification is not specifically limited. Examples of the usable SPS include the polymer as indicated in the aforesaid component (a-1), and a copolymer of styrene and a substituted styrene as a preferable one from the viewpoint of compatibility with the other components. The compositional ratio in the copolymer is not specifically limited, but is preferably in the range of 3 to 50 mol % for the substituted styrene unit. A ratio of the substituted styrene less than 3 mol % unfavorably causes difficulty in modification, whereas that more than 50 mol % unfavorably leads to a decrease in compatibility with other components. Examples of the particularly desirable substituted styrene as the comonomer for the copolymer include an alkylstyrene such as methylstyrene, ethylstyrene, isopropyl-styrene, tert-butylstyrene and vinylstyrene; a halogenated styrene such as chlorostyrene, bromostyrene and fluorostyrene: a halogenated alkylstyrene such as chloromethylstyrene; and alkoxystyrene such as methoxystyrene and ethoxystyrene. The above-exemplified substituted styrene may be used alone or in combination with at least one other one.

In addition, the polymer having atactic configuration may be used provided that the content of the atactic configuration is not more than 5% by weight based on SPS. A content thereof more than 5% by weight unfavorably deteriorates the heat resistance of the composition to be produced.

There is usable, as a modifying agent to be used for modifying the above-mentioned SPS, a compound having an ethylenic double bond and a polar group in the same molecule, which is exemplified by maleic anhydride, maleic acid, maleic acid ester, maleimide, N-substituted product thereof, maleate, acrylic acid, acrylic acid ester, acrylic acid amide, acrylate, methacrylic acid, methacrylic acid ester, methacrylic acid amide, methacrylate and glycidyl methacrylate. Of the above-exemplified agents, maleic anhydride and glycidyl methacrylate are preferably used. The modifying agent may be used alone or in combination with at least one other modifying agent.

The modified SPS is obtained, for example, by reacting the above-mentioned SPS with a modifying agent in the presence of a solvent or a resin other than SPS. There is no specific limit to the method of modification, but there are available publicly known methods such as a method wherein the SPS and the modifying agent are melt kneaded at a temperature in the range of 150° to 300° C. to proceed with reaction by the use of a roll mill, Banbury mixer, extruder or the like, and a method in which the aforesaid components are reacted with heating in a solvent such as benzene, toluene, xylene or the like. In order to readily proceed with the reaction, it is effective to allow a radical generating agent to be present in the reaction system which is exemplified by benzoyl peroxide, di-tert-butyl peroxide, dicumyl peroxide, tert-butyl peroxybenzoate, azobis(isobutyronitrile), azobis (isovaleronitrile) and 2,3-diphenyl-2,3-dimethyl-butane. A preferable method is a method by melt kneading in the presence of a radical generating agent.

Of the modified SPS, maleic anhydride-modified SPS is particularly preferably used. Moreover the modified SPS as the component (a-2) may be used alone or in combination with at least one other one.

The amount of the above-mentioned component (a-1) or (a-2) to be compounded in the composition is 1 to 95%, preferably 3 to 90%, more preferably 5 to 85% each by weight based on the total weight of the resin components. An amount thereof of less than 1% by weight does not improve the stability of the thermoplastic resin as the component (b) for the resistance to water, acid and alkali as compared with the case of the component (b) alone, whereas an amount thereof of more than 95% by weight results in failure to sufficiently exert the effect on improving the mechanical strength of the SPS as the component (a-1) or the modified SPS as the component (a-2).

There is employed a thermoplastic resin having a reactive polar group as the component (b) in each of the resin compositions in the first (1) to sixth (6) aspects of the present invention. The thermoplastic resin having such a reactive polar group is that having at least one polar group such as carboxyl group, hydroxyl group or amino group, which is exemplified by polyethylene terephthalate, polypropylene terephthalate, ploybutylene terephthalate, polycyclohexanedimethylene terephthalate, polyoxyethoxy benzoate, polyethylene naphthalate, a polyester obtained by copolymerizing the constitutional component of the above-mentioned polyester with other acid component such as isophthalic acid, p-oxybenzoic acid, adipic acid, sebacic acid, glutaric acid, diphenylmethanedicarboxylic acid or dimer acid and/or glycol component such as hexamethylene glycol, diethylene glycol or neopentyl glycol-alkylene oxide adduct, a polyester in the wide sense of the word such as aromatic polyester/polyether block copolymer, aromatic polyester/polylactone block copolymer or polyarylate, polyamide, polycarbonate, polyolefin such as polar group-modified polyethylene or polar group-modified polypropylene and polyarylene sulfide. Of these, polyamide is particularly suitable.

As polyamide mentioned above, all of the known polyamides are usable. Examples of suitable polyamides include polyamide-4; polyamide-6; polyamide-6,6; polyamide-3,4; polyamide-12; polyamide-11; polyamide-6,10; polyamide, obtained from terephthalic acid and 4,4'-diaminocyclohexylmethane; polyamide obtained from azelaic acid, adipic acid and 2,2-bis(p-aminocyclo-hexyl) propane; and polyamide obtained from adipic acid and m-xylylenediamine. An aromatic polyamide resin is a polyamide polymer containing an amide bond having an aromatic ring in the main chain as the repeating unit. Specifically, the aromatic polyamide resin is suitably selected for use from the polymer obtained by reacting an aromatic dimaine component with a dicarboxylic acid component by a conventional process and polymer obtained by reacting a diamine component with a dicarboxylic acid component having an aromatic ring by a conventional process.

As the aromatic diamine component, there are used the diamine compounds each having a benzene ring, exemplified by 1,4-diaminobenzene; 1,3-(iiaminobenzene; 1,2-diaminobenzene; 2,4-diamino-toluene; 2,3-diaminotoluene; 2,5-diaminotoluene; 2,6-diaminotoluene; ortho-, meta- or para-xylylenediamine; ortho-, meta- or para-2,2'-diaminodiethylbenzene; 4,4'-diaminobiphenyl; 4,4'-diaminodiphenylmethane; 4,4'-diaminodiphenyl ether; 4,4', -diaminodiphenyl thioether; 4,4'-diaminodiphenyl ketone and 4,4'-diaminodiphenylsulfone. The above-mentioned aromatic diamine compound having a benzene ring may be used alone or in combination with other diamine compound/s such as an aliphatic diamine so long as the aromatic diamine component is contained. Needless to say, two or more kinds of the aromatic diamines may be used as a mixture.

As the dicarboxylic acid, mention may be made of aliphatic dicarboxylic acid exemplified by glutaric acid; adipic acid; pimelic acid; suberic acid; azelic acid and sebacic acid, aromatic dicarboxylic acid exemplified by phthalic acid; isophthalic acid; terephthalic acid; and naphthalenedicarboxylic acid and esters and acid chlorides of the aforesaid dicarboxylic acids. The above-mentioned compound may be used alone or in combination with at least one other compound.

The aromatic polyamide resin is also obtained by polymerizing a ω-amino-ω'-carboxyl compound having an aromatic ring, which is exemplified by 4-aminophenyl-carboxymethane; 1-(4-aminophenyl)-2-carboxyethane; 3-(4-aminophenyl)-1-carboxypropane; and p-(3-amino-3'-carboxy)dipropylbenzene. Preferable aromatic polyamide resin is a polyamide derived from a diamine compound having a benzene ring and an aliphatic dicarboxylic acid, more desirably a polyamide derived from xylylenediamine and adipic acid.

The above-mentioned thermoplastic resin having a reactive polar group as the component (b) may be used alone or in combination with at least one other one. The amount thereof to be blended is 1 to 95%, preferably 3 to 90%, more preferably 5 to 85% each by weight based on the total weight of the resin components. An amount thereof less than 1% by weight results in failure to sufficiently exhibit the effect on improving the mechanical strength of the SPS as the component (a-1) or the modified SPS as the component (a-2), whereas an amount more than 95% by weight does not improve the stability of the component (b) for the resistance to water, acid and alkali as compared with the case of the component (b) alone. The polyester and polycarbonate thermoplastics exhibit the same superior effects as the polyamide.

There are used as the component (c-1), a rubbery elastomer having an affinity for the aforesaid component (a-1) in the resin composition in the first (1) aspect of the present invention, and as the component (c-2), a rubbery elastomer having an affinity for the aforestated component (a-2) in the resin composition in the second (2) and third (3) aspects of the present invention.

The rubbery elastomer is compounded in the composition for the purpose of improving the toughness such as impact resistance and elongation.

In this case, the rubbery elastomer having an affinity for the component (a-1) or (a-2) signifies such rubbery elastomer that has a chain having an affinity for SPS as the component (a-1) or modified SPS as the component (a-2) and is exemplified by that having a styrenic chain, styrenic copolymer segment or polyphenylene ether segment as a main chain, block chain or graft chain, a random copolymer rubber having styrenic monomer unit and a core shell rubber having styrenic polymer shell.

Examples of the rubbery elastomers to be used as the component (c-1) or (c-2) include styrene/butyl acrylate copolymer, styrene/butadiene block copolymer(SBR), hydrogenated styrene/butadiene block copolymer(SEB), styrene/butadiene/styrene block copolymer(SBS), hydrogenated styrene/butadiene/styrene block copolymer(SEBS), styrene/isoprene block copolymer(SIR), hydrogenated styrene/isoprene block copolymer(SEP), styrene/isoprene/ styrene block copolymer(SIS), hydrogenated styrene/ isoprene/styrene block copolymer(SEPS), styrene/butadiene random copolymer, hydrogenated styrene/butadiene random copolymer, styrene/ethylene/propylene random copolymer, styrene/ethylene/butylene random copolymer, or a core shell type powdery elastomer such as butadiene/acrylonitrile/ styrene core shell rubber(ABS), methyl methacrylate/ butadiene/styrene core shell rubber(MBS), methyl- methacrylate/butyl-acrylate/styrene core shell rubber (MAS), octyl-acrylate/butadiene/styrene core shell rubber (MABS), alkyl-acrylate/butadiene/acrylonitrile/styrene core shell rubber(AABS) and butadiene/styrene core shell rubber (SBR). Of these, are preferably usable, SEB, SEBS, SEPS, styrene unit-containing core shell rubber, etc. in particular.

As the core shell rubber, methyl-acrylate/butyl-acrylate/ siloxane/styrene core shell rubber(MASS), MAS, MBS, and the like are preferable in particular. The particle diameter of the core shell rubber is not particularly limited, but should be selected in the range of preferably 0.05 to 1.5 µm, particularly preferably 0.1 to 1.0 µm. A particle diameter thereof smaller than 0.05 µm does not necessarily exert sufficient effect on improving the impact resistance of the resin composition, whereas that larger than 1.5 µm leads to unfavorable dispersibility, thus resulting in the fear of failing to effectively improve the impact resistance thereof.

The amount of the core shell rubber to be compounded in the composition is not specifically limited, however, it is better to compound it so as to occupy 5 to 95%, preferably 20 to 80% by weight in the rubbery elastomer as the component (c-1) or (c-2). An amount thereof outside the aforesaid range sometimes causes failure to sufficiently manifest the effect from the use thereof.

The rubbery elastomer as the component (c-1) or (c-2) may be used alone or in combination with at least one other one, and the amount thereof to be compounded in the composition is selected in the range of 1 to 50%, preferably 5 to 40% by the weight based on the total weight of the resin components. An amount thereof of less than 1% by weight results in failure to sufficiently exhibit the effect on improving the impact resistance of the composition, whereas an amount of more than 50% by weight brings about a remarkable decrease in both the modulus of elasticity and heat resistance for the composition.

In the composition according to the present invention there may be blended as desired, in combination with the rubbery elastomer as the component (c-1) or (c-2), another rubbery elastomer, which is exemplified by natural rubber, polybutadiene, polyisoprene, polyisobutylene, neoprene, polysulfide rubber, thiokol rubber, acrylic rubber, urethane rubber, silicone rubber, epichlorohydrin rubber, ethylene/ propylene rubber and ethylene/propylene/diene rubber (EPDM).

In the case where the another rubbery elastomer is used in combination, the total amount of the component (c-1) or (c-2) and the another rubbery elastomer is preferably at most 50% by weight from the standpoint of modulus of elasticity and heat resistance.

There is employed as the component (c-3), a rubbery elastomer which has a polar group capable of reacting with the aforesaid component (b) as well as an affinity for the above-mentioned component (a-1) in the resin composition in the fourth (4) aspect of the present invention. In addition, there is employed as component (c-4), a rubbery elastomer which has both a polar group capable of reacting with the aforesaid component (b) and an affinity for the above-mentioned component (a-2) in the resin compositions in the fifth (5) and sixth (6) aspects of the present invention.

As is the case with the components (c-1) and (c-2), the rubbery elastomer as the component (c-3) or (c-4) is compounded for the purpose of improving the toughness such as impact resistance and elongation.

The term "a polar group capable of reacting with the component (b)" refers to a functional group capable of reacting with a polar group contained in the component (b), and is specifically exemplified by a group of any of acid anhydride, carboxylic acid, carboxylic acid ester, carboxylic acid chloride, carboxylic acid amide, carboxylate, sulfonic acid, sulfonic acid ester, sulfonic acid chloride, sulfonic acid amide and sulfonate, epoxy group, amino group, imide group and oxazoline group.

The term "rubbery elastomer which has an affinity for the component (a-1) or (a-2)" refers to that which has a chain having an affinity for the SPS as the component (a-1) or the modified SPS as the component (a-2), and is specifically exemplified by a rubbery elastomer which has a styrene chain, styrenic copolymer segment, polyphenylene ether segment or the like as the main chain, block chain or graft chain and a random copolymer rubber containing a styrenic monomer unit.

Examples of the rubbery elastomers to be used as the component (c-3) or (c-4) include a modified rubber obtained by modifying, with a modifying agent having a polar group, such copolymer as styrene/butyl acrylate copolymer, styrene/butadiene(SBR) block copolymer, hydrogenated styrene/butadiene (SEB) block copolymer styrene/ butadiene/styrene (SBS) block copolymer, hydrogenated styrene/butadiene/styrene (SEBS) block copolymer styrene/ isoprene (SIR) block copolymer, hydrogenated styrene/ isoprene (SEP) block copolymer styrene/isoprene/styrene (SIS) block copolymer, hydrogenated styrene/isoprene/ styrene (SEPS) block copolymer styrene/butadiene random copolymer, hydrogenated styrene/butadiene random copolymer, styrene/ethylene/propylene random copolymer, styrene/ethylene/butylene random copolymer, etc. Of these, are preferably usable the modified rubber obtained by modifying SEB, SEBS, SEP, SEPS, etc. in particular. Specific examples thereof include maleic anhydride-modified SEBS, epoxy-modified SEBS and epoxy-modified SEPS.

The above-mentioned rubbery elastomer as the component (c-3) or (c-4) may be used alone or in combination with at least one other one, and the amount thereof to be compounded in the composition is selected in the range of 1 to 50%, preferably 5 to 40% by weight based on the total weight of the resin components. An amount thereof of less than 1% by weight results in failure to sufficiently exert the effect on improving the impact resistance of the composition, while an amount of more than 50% by weight brings about a remarkable decrease in both the modulus of elasticity and heat resistance for the composition.

Moreover in the resin composition according to the present invention there may be blended as desired, in combination with the rubbery elastomer as the component (c-3) or (c-4), other rubbery elastomer, which is exemplified by natural rubber, polybutadiene, polyisoprene, polyisobutylene, neoprene, polysulfide rubber, thiokol rubber, acrylic rubber, urethane rubber, silicone rubber, epichorohydrin rubber, styrene/butadiene (SBR) block copolymer, hydrogenated styrene/butadiene (SEB) block copolymer, styrene/butadiene/styrene (SBS) block copolymer, hydrogenated styrene/butadiene/styrene (SEBS) block copolymer, styrene/isoprene (SIR) block copolymer, hydrogenated styrene/isoprene (SEP) block copolymer, styrene/isopreneistyrene (SIS) block copolymer, hyarogenated styrene/isoprene/styrene (SEPS) block copolymer, styrene/butadine random copolymer, hydrogenated styrene/butadiene random copolymer, styrene/ethylene/propylene random copolymer, styrene/ethylene/butylene random copolymer, ethylene/propylene(EPR) rubber, ethylene/propylene/diene (EPDM) rubber or a core shell type powdery elastomer such as butadiene/acrylonitrile/styrene(ABS) core shell rubber, methyl methacrylate/butadiene/styrene (LMBS) core shell rubber, methyl-methyacrylate/butyl-acrylate/styrene (MAS) core shell rubber, octyl-acrylate/butadiene/styrene (MABS) core shell rubber, alkyl-acrylate/butadiene/acrylonitrile/styrene (AABS) core shell rubber and butadiene/styrene (SBR) core shell rubber and or a modified rubber obtained by modifying any of the above-mentioned copolymer or rubber. Of there, are preferably usable SBR, SER, SBS, SEBS, SIR, SEP, SIS, SEPS, styrene unit-containing core shell rubber, etc. in particular. As the core shell rubber, methyl-acrylate/butyl-acrylate/siloxane/styrene core shell rubber(MASS), MAS, MBS and the like are preferable in particular. The particle diameter of the core shell rubber is not particularly limited, but should be selected in the range of preferably 0.05 to 1.5 μm, particularly preferably 0.1 to 1.0 μm. A particle diameter thereof smaller than 0.05 μm does not necessary exert sufficient effect on improving the impact resistance of the resin composition, whereas that larger than 1.5 μm leads to unfavorable dispersibility, thus resulting in the fear of failing to effectively improve the impact resistance thereof.

The amount of the aforesaid rubbery elastomer, when used in combination, is preferably compounded so as to make a total compounding ratio of at most 50% by weight together with the component (c-3) or (c-4) from the viewpoint of modulus of elasticity and heat resistance.

The amount of the core shell rubber to be compounded in the composition is not specifically limited, however, it is better to compound it so as to occupy 5 to 95%, preferably 20 to 80% by weight in the rubbery elastomer as the component (c-3) or (c-4). An amount thereof outside the aforesaid range sometimes cause failure to sufficiently manifest the effect from the combined use of the rubbery elastomer as the component (c-1) or (c-2) with the core shell rubber.

There is employed as the component (d-1), a compatibilizer which has compatibility with the component (a-1) and a polar group capable of reacting with the component (b) in the resin composition in the first (1) and forth (4) aspects of the present invention. Furthermore there is employed as the component (d-2), a compatibilizer which has compatibility with the component (a-2) and a polar group capable of reacting with the component (b) in the resin composition in the third (3) and sixth (6) aspect of the present invention.

The compatibilizer is compounded in the resin composition for the purpose of improving the compatibility between the component (a-1) or (a-2) and the component (b), finely dispersing the domain and enhancing the interfacial strength.

In the component (d-1) or (d-2), the term "a polar group capable of reacting with the component (b)" refers to a functional group capable of reacting with a polar group contained in the component (b), and is specifically exemplified by a group of any of acid anhydride, carboxylic acid, carboxylic acid ester, carboxylic acid chloride, carboxylic acid amide, carboxylate, sulfonic acid, sulfonic acid ester, sulfonic acid chloride, sulfonic acid amide and sulfonate, epoxy group, amino group, imide group and oxazoline group.

The term "compatibilizer which has compatibility with the component (a-1) or (a-2)" refers to that which has a skeleton having compatibility with the SPS as the component (a-1) or the modified SPS as the component (a-2), and is specifically exemplified by a compatibilizer which has a styrene chain, styrenic copolymer segment, polyphenylene ether segment or the like as the main chain, or graft chain.

Specific examples of the compatibilizer to be used as the component (d-1) include styrene/maleic anhydride copolymer(SMA), styrene/glycidyl methacrylate copolymer, carboxylic acid end-modified poly-styrene, oxazoline end-modified polystyrene, amine end-modified polystyrene, sulfonated polystyrene, styrenic ionomer, styrene/methyl methacrylate graft copolymer, (styrene/glycidyl methacrylate)/methyl methacrylate graft copolymer, acid modified acrylate/styrene graft copolymer, (styrene/glycidyl methacrylate)/styrene graft copolymer, polyethylene terephthalate/polystyrene graft copolymer, modified SPS such as maleic anhydride modified SPS, glycidyl methacrylate modified SPS and amine-modified SPS, and modified polyphenylene ether such as (styrene/maleic anhydride)/polyphenylene ether graft copolymer, maleic anhydride modified polyphenylene ether, glycidyl methacrylate modified polyphenylene ether and amine modified polyphenylene ether. Of these, modified SPS and modified polyphenylene ether are particularly suitable.

As the above-mentioned modified SPS, mention may be made of the modified SPS same as that as described as the component (a-2). The modified polyphenylene ether can be produced by modifying the publicly known polyphenylene ether by the use a modifying agent, but is not limited to this method, provided that it is usable for the purpose of the present invention.

The above-mentioned polyphenylene ether is a publicly known compound, and for using the compound for the aforestated object, reference may be made to U.S. Pat. Nos. 3,306,874, 3,306,875, 3,257,357 and 3,257,358. Polyphenylene ether is prepared usually by oxidative coupling reaction which forms a homopolymer or a copolymer in the presence of a cupramine complex and at least one di-or-tri-substituted phenol. As the cupramine complex there may be used the cupramine complex derived from any of primary, secondary and tertiary amines.

Specific Examples of the suitable polyphenylene ether include poly(2,3-dimethyl-6-ethyl-1,4-phenylene ether), poly(2-methyl-6-chloromethyl-1,4-phenylene ether), poly(2-methyl-6-hydroxyethyl-1,4-phenylene ether), poly(2-methyl-6-n-butyl-1,4-phenylene ether), poly(2-ethyl-6-isopropyl-1,4-phenylene ether), poly(2-ethyl-6-n-propyl-1,4-phenylene ether), poly(2,3,6-trimethyl-1,4-phenylene ether), poly[2-(4'-methylphenyl)-1,4-phenylene ether], poly(2-bromo-6-phenyl-1,4-phenylene ether), poly(2-methyl-6-phenyl-1,4-phenylene ether), poly(2-phenyl-1-,4-phenylene ether), poly(2-chloro-1,4-phenylene ether), poly(2-methyl-1,4-phenylene ether), poly(2-chloro-6-ethyl-1,4-phenylene ether), poly(2-chloro-6-bromo-1,4-phenylene ether), poly(2,6-di-n-propyl-1,4-phenylene ether), poly(2-methyl-6-isopropyl-1,4-phenylene ether), poly(2-chloro-6-methyl-1,4-phenylene ether), poly(2-methyl-6-ethyl-1,4-phenylene ether), poly(2,6-dibromo-1,4-phenylene ether), poly(2,6-dichloro-1,4-phenylene ether), poly(2,6-diethyl-1,4-phenylene ether) and poly(2,6-dimethyl-1,4-phenylene ether). Other suitable examples of the polyphenylene ether include a copolymer derived from at least two phenolic compounds that are used for the preparation of the above-mentioned homopolymer and a graft copolymer or a block copolymer of an aromatic vinyl compound such as polystyrene and the aforestated polyphenylene ether. Among the above-mentioned polyphenylene ether, poly(2,6-dimethyl-1,4-phenylene ether) is particularly desirable for use.

As the modifying agent used for modifying the polyphenylene ether, there is used a compound having an ethylenic double bond and a polar group in the same molecule, which is specifically exemplified by maleic anhydride, maleic acid, maleic acid ester, maleimide, N-substituted compound thereof, maleic acid salt, acrylic acid, acrylic acid ester, acrylic acid amide, acrylic acid salt, methacrylic acid, methacrylic acid ester, methacrylic acid amide, methacrylic acid salt and glycidyl methacrylate, among which are preferably used maleic anhydride and glycidyl methacrylate in particular. The modifying agent may be used alone or in combination with at least one other one.

The modified polyphenylene ether is obtained, for example by reacting the above-mentioned polyphenylene ether with a modifying agent in the presence of a solvent or an other resin. There is no specific limit to the method of modification, but there are available publicly known methods such as a method wherein the SPS and the modifying agent are melt kneaded at a temperature in the range of 150° to 300° C. to proceed with reaction by the use of a roll mill, Banbury mixer, extruder or the like, and a method in which the aforesaid components are reacted with heating in a solvent such as benzene, toluene, xylene or the like. In order to readily proceed with the reaction, it is effective to allow a radical generating agent to be present in the reaction-system which is exemplified by benzoyl peroxide, di-tert-butyl peroxide, dicumyl peroxide, tert-butyl peroxybenzoate, azobis(isobutyronitrile), azobis (isovaleronitrile) and 2,3-diphenyl-butane. A preferable method is a method by melt kneading in the presence of a radical generating agent.

Of the modified polyphenylene ether, maleic anhydride-modified one is particularly preferably used. As the compatibilizer to be used as the component (d-2), mention may be made of those exemplified as the above-mentioned component (d-1) from which the modified SPS is excluded.

The compatibilizer as the component (d-1) or (d-2) may be used alone or in combination with at least one other one.

The content of the polar group in the component (d-1) or (d-2) is preferably 0.01 to 20%, more preferably 0.05 to 10% by weight. A content thereof of less than 0.01% by weight unfavorably causes necessity for a large amount of the component (d-1) or (d-2) to be compounded, resulting in a deterioration of dynamic properties and heat resistance of the composition to be obtained, whereas a content thereof of more than 20% by weight unfavorably causes a decrease in compatibility with the component (a-1) or (a-2).

The amount of the above-mentioned component (d-1) or (d-2) to be blended is selected in the range of 0.1 to 10%, preferably 0.5 to 8% by weight based on the total weight of the resin components. An amount thereof of less than 0.1% by weight result in failure to sufficiently exert the effect as a compatibilizer, thus causing poor dispersion or insufficient interfacial strength, while an amount more than 10% by weight unfavorably brings about a remarkable decrease in the heat resistance of the objective composition.

It is preferable that an inorganic filler be blended as the component (e) in the resin compositions in the first (1) to sixth (6) aspects of the present invention for the purpose of further improving the modulus of elasticity and heat resistance of the resin compositions.

The form of the inorganic filler is not specifically limited, but may be any of the forms including fiber, granule and powder. Examples of the fibrous fiber include glass fiber, carbon fiber and whisker in the form of cloth, mat, bound and cut fiber, short fiber, filament, wisker, etc.

There is preferably used the bound and cut fiber having a length of 0.05 to 50 mm and a diameter of 5 to 20 µm. Examples of granular or powdery filler include talc, carbon black, graphite, titanium oxide, silica, mica, calcium carbonate, calcium sulfate, barium carbonate, magnesium carbonate, magnesium sulfate, barium sulfate, calcium oxysulfate, tin oxide, alumina, kaolin, silicon carbide, metallic powder, glass powder, glass flake and glass bead.

Among the above-mentioned various inorganic fillers are particularly desirable glassy fillers including glass powder, glass flake, glass bead, glass filament, glass fiber, glass roving and glass mat.

The above-mentioned filler is preferably surface-treated with a coupling agent, which is used for surface treatment for the purpose of improving adhesiveness between the filler and the resin and may be optionally selected for use from the publicly known silane-based coupling agent and titanium-based coupling agent. Examples of the preferably usable coupling agent among them include aminosilane such as γ-aminopropyltrimethoxysilane, N-β-(aminomethyl)-γ-aminopropyltrimethoxysilane, γ-glycidoxypropyltrimethoxysilane and β-(3,4-epoxy-cyclohexyl)ethyltrimethoxysilane, epoxysilane, isopropyltri (N-amidoethyl-amino ethyl)titanate, etc.

The above-mentioned inorganic filler may be used alone or in combination with at least one other one. The amount thereof to be blended is selected in the range of 1 to 350, preferably 5 to 200 parts by weight based on 100 parts by weight of the resin composition. An amount thereof less than 1 part by weight leads to failure to sufficiently exert the blending effect as a filler, whereas that more than 350 parts by weight gives rise to the disadvantage that the dispersibility thereof is worsened, thereby making it difficult to mold the composition.

The resin composition according to the present invention may be blended with an additive such as antioxidant, nucleating agent, plasticizer, mold release agent, flame retardant, pigment, carbon black and antistatic agent or an other thermoplastic resin to the extent that the object of the present invention is not impaired.

By the use of the styrenic resin composition according to the present invention, moldings having excellent physical properties can be obtained irrespective of the molding method. As the moldings, mention may be made of those by injection molding, sheets and films by extrusion molding, containers and trays by extrusion molding and thermoforming, uniaxially or biaxially oriented films and sheets, fibrous moldings by spinning, and the like.

By virtue of its being excellent in rigidity, toughness, compatibility, heat resistance, impact resistance, acid/alkali resistance, water resistance, etc. the styrenic resin composition according to the present invention can find a wide variety of effective use in molding industrial materials including electric and electronic materials such as connectors and print-circuit board; industrial construction materials; automobile parts such as connectors to be mounted on vehicles, wheel cap and cylinder head cover; domestic electrical appliances, various machine parts, etc.

In the following, the present invention will be described in further detail with reference to examples, which however shall not limit the present invention thereto.

The physical properties of the resin composition were obtained by the following ways.

13

(1) Izod impact strength: according to JIS (Japanese Industrial Standard) K-7110.

(2) Elongation: according to JIS K-7113

(3) Flexural modulus of elasticity: JIS K-7203

(4) Heat distortion temperature: JIS K-7207

(5) Water absorption properties: JIS K-7209

Preparation Example 1

In a 2 l reaction vessel were placed 1.0 l of purified styrene, 1 mmol of triethylaluminum, and after heating to 80° C., 16.5 ml of a premixed catalyst comprising 90 μmol of pentamethylcyclopentadienyltitanium trimethoxide, 90 μmol of dimethylaliniumtetrakeis(pentafluorophenyl)borate, 29.1 mmol of toluene and 1.8 mmol of triisobutylaluminum, which were then subjected to polymerization reaction at 80° C. for 5 hours.

After the completion of the reaction, the reaction product was washed with methanol repeatedly and dried to afford 380 g of polymer. As the result of analysis by gel permeation chromatography using 1,2,4-trichlorobenzene at 130° C. as the solvent, the polymer thus produced had a weight-average molecular weight of 320,000 and a ratio of weight-average molecular weight to number-average molecular weight of 2.60.

It was confirmed that the polymer was polystyrene having syndiotactic configuration(SPS) from the results of melting point measurement and $^{13}$C-NMR analysis using carbon isotope.

Preparation Example 2

In a 2 l reaction vessel were placed 0.9 l of purified styrene, 0.1 l of P-methylstyrene, 1 mmol of triethylaluminum, and after heating to 80° C., 16.5 ml of a premixed catalyst comprising 90 μmol of pentamethylcyclopentadienyltitanium trimethoxide, 90 μmol of dimethylalininiumtetrakis(pentafluorophenyl)borate, 29.1 mmol of toluene and 1.8 mmol of triisobutylaluminum, which were then subjected to polymerization reaction at 80° C. for 5 hours.

After the completion of the reaction, the reaction product was washed with methanol repeatedly and dried to afford 390 g of polymer. As the result of analysis by gel permeation chromatography using 1,2,4-trichlorobenzene at 130° C. as the solvent, the polymer thus produced had a weight-average molecular weight of 328,000 and a ratio of weight-average molecular weight to number-average molecular weight of 2.60.

It was confirmed that the polymer was polystyrene having syndiotactic configuration(SPS) and p-methylstyrene unit content of 12 mol % from the results of melting point measurement and $^{13}$C-NMR analysis using carbon isotope.

Preparation Example 3

One (1) kg of styrene/p-methylstyrene copolymer (p-methyl-styrene unit content of 12 mol %) produced in Preparation Example 2, 30 g of maleic anhydride, and 10 g of 2,3-dimethyl-2,3-diphenylbutane (produced by Nippon Oil & Fat Co., Ltd. under the trade name "NOPHMER") as a radical generating agent were dry-blended and melt kneaded by the use of a 30 mm twin-screw extruder at a revolution of 200 rpm at a temperature set to 300° C., while the resin temperature was about 330° C. The resultant strand was cooled and reprecipitated in methanol, and the recovered polymer was subjected to Soxhlet extraction and dried.

14

Thereafter, the modification efficiency was determined from the intensity of carbonyl absorption in infrared (IR) absorption spectrum. As a result, the modification efficiency was 1.05% by weight.

Preparation Example 3A

One (1) kg of SPS produced in Preparation Example 1, 30 g of maleic anhydride, and 10 g of cumene hydroxyperoxide as a radical generating agent were dry-blended and melt kneaded by the use of a 33 mm twin-screw extruder at a revolution of 200 rpm at a temperature set to 33° C. The resultant strand was cooled and then pelletized to produce maleic anhydride-modified polyphenylene ether. In order to measure the modification efficiency, one (1) g of the resultant modified polyphenylene ether was dissolved in ethylbenzene and then reprecipitated in methanol, and the recovered polymer was subjected to Soxhlet extraction and dried. Thereafter, the modification efficiency was determined from the intensity of carbonyl absorption in infrared (IR) absorption spectrum. As a result, the modification efficiency was 1.05% by weight.

Preparation Example 4

One (1) kg of polyphenylene ether (intrinsic viscosity of 0.47 dl./g in chloroform at 25° C.), 60 g of maleic anhydride, and 10 g of 2,3-dimethyl-2,3-diphenylbutane (produced by Nippon Oil & Fat Co., Ltd. under the trade name "NOPHMER") as a radical generating agent were dry-blended and melt kneaded by the use of a 30 mm twin-screw extruder at a revolution of 200 rpm at a temperature set to 300° C., while the resin temperature was about 330° C. The resultant strand was cooled and then pelletized to produce maleic anhydride-modified polyphenylene ether. In order to measure the modification efficiency, one (1) g of the resultant modified polyphenylene ether was dissolved in ethylbenzene and then reprecipitated in methanol, and the recovered polymer was subjected to Soxhlet extraction and dried. Thereafter, the modification efficiency was determined from the intensity of carbonyl absorption in infrared (IR) absorption spectrum. As a result, the modification efficiency was 2.0% by weight.

EXAMPLE 1

To 100 parts by weight of the mixture comprising 22.2% by weight of SPS in Preparation Example 1 (weight-average molecular weight of 320,000, weight-average molecular weight Mw/number-average molecular weight Mn of 2.60), 70% by weight of polyamide 66 (produced by Ube Industries Ltd. under the trade name "2015B"), 6.0% by weight of SEBS as a rubbery elastomer (produced by Shell Kagaku K.K. under the trade name "Kraton G-1651"), and 1.8% by weight of maleic anhydride-modified SPS in Preparation Example 3 as a compatibilizer were added 0.1 part by weight of (2,6-di-tert-butyl-4-methylphenyl)pentaerythritol diphosphite (produced by Adeka Argus Co., Ltd. under the trade name "PEP-36") as an antioxidant and 0.1 part by weight of tetrakis [methylene-3-(3',5'-di-tert-butyl-4'-hydroxyphenyl)] propionate (produced by Adeka Argus Co., Ltd. under the trade name "MARK AO60") also as an antioxidant, and the resultant mixture was dry-blended with a Henschel mixer. Subsequently the blend was melt kneaded and pelletized with a twin-screw extruder. The pellet thus obtained was injection molded to produce test pieces for tensile test, flexural test and Izod impact test, respectively. Measurements were made of Izod impact strength, elongation, modulus of elasticity and heat distortion temperature of the test pieces thus obtained. The results are given in Table 1.

EXAMPLES 2 & 3

The procedure in Example 1 was repeated except that the blend composition was altered as given in Table 1. The results are given in Table 1.

EXAMPLE 4

The procedure in Example 1 was repeated except that 1.8% by weight of the maleic anhydride-modified polyphenylene ether in Preparation Example 4 was used as a compatibilizer in the component (d-1). The results are given in Table 1.

EXAMPLES 5 & 6

The procedure in Example 4 was repeated except that the blend composition was altered as given in Table 1. The results are given in Table 1.

EXAMPLE 5A

The procedure in Example 5 was repeated except that MASS of core shell type (produced by Mitsubishi Rayon Co., Ltd. under the trade name "S-2001") was used in place of SEBS (produced by Shell Kagaku K.K. under the trade name "G-1651"). The results are given in Table 1.

EXAMPLE 6

The procedure in Example 4 was repeated except that the blend composition was altered as given in Table 1. The results are given in Table 1.

EXAMPLE 6A

The procedure in Example 6 was repeated except that MASS of core shell type (produced by Mitsubishi Rayon Co., Ltd. under the trade name "S-2001") was used in place of SEBS (produced by Shell Kagaku K.K. under the trade name "G- 1651"). The results are given in Table 1.

EXAMPLE 7

The procedure in Example 1 was repeated except that 24.0% by weight of the maleic anhydride-modified SPS in Preparation Example 3 was used as the component (a-2) and that neither the component (d-1) nor the component (d-2) was used. The results are given in Table 1.

EXAMPLE 8

The procedure in Example 4 was repeated except that there was used 0.5 part by weight of sodium-2,2'-methylenebis(4,6-di-tert-butylphenyl)phosphate (produced by Adeka Argus Chemical Co., Ltd. under the trade name "NA-11") as a nucleating agent in addition to 100 parts by weight of the composition in Example 4. The results are given in Table 1.

EXAMPLE 8A

The procedure in Example 8 was repeated except that MASS of core shell type (produced by Mitsubishi Rayon Co., Ltd. under the trade name "S-2001") was used in place of SEBS (produced by Shell Kagaku K.K. under the trade name "G-1651"). The results are given in Table 1.

Comparative Examples 1 & 2

The procedure in Example 1 was repeated except that SPS and polyamide were used in an amount of 100% by weight, respectively. The results are given in Table 1.

Comparative Examples 3 to 5

The procedure in Example 1 was repeated except that a compatibilizer as the component (d-1) was not incorporated and that the blend composition was altered as given in Table 1. The results are given in Table 1.

Comparative Examples 6 to 11

The procedure in Example 1 or 4 was repeated except that a rubbery elastomer as the component (c-1) was not incorporated and that the blend composition was altered as given in Table 1. The results are given in Table 1.

Comparative Example 12

The procedure in Example 7 was repeated except that a rubbery elastomer as the component (c-2) was not incorporated and that the blend composition was altered as given in Table 1. The results are given in Table 1.

TABLE 1-1

| Example and Comp. | Blending Resin (100 parts by weight) | | | | | | | |
|---|---|---|---|---|---|---|---|---|
| | (a-1), (a-2) SPS Preparation Example (wt %) | | | (b) Polyamide 2015B (wt %) | (c-1)(c-2) Rubber G-1651 (wt %) | (d-1), (d-2) Compatibilizer Preparation Example (wt %) | | |
| Example | 1 | 3 | 3A | | | 3 | 3A | 4 |
| Example 1 | 22.2 | — | — | 70.0 | 6.0 | 1.8 | — | — |
| Example 2 | 37.0 | — | — | 50.0 | 10.0 | 3.0 | — | — |
| Example 3 | 77.0 | — | — | 10.0 | 10.0 | 3.0 | — | — |
| Example 4 | 22.2 | — | — | 70.0 | 6.0 | — | — | 1.8 |
| Example 5 | 37.0 | — | — | 50.0 | 10.0 | — | — | 3.0 |
| Example 6 | 77.0 | — | — | 10.0 | 10.0 | — | — | 3.0 |
| Example 7 | — | 24.0 | — | 70.0 | 6.0 | — | — | — |
| Example 8 | 22.2 | — | — | 70.0 | 6.0 | — | — | 1.8 |
| Example 31 | 22.2 | — | — | 70.0 | 6.0 | — | 1.8 | — |
| Example 32 | 37.0 | — | — | 50.0 | 10.0 | — | 3.0 | — |
| Example 33 | 77.0 | — | — | 10.0 | 10.0 | — | 3.0 | — |
| Example 38 | — | 24.0 | — | 70.0 | 6.0 | — | — | — |
| Comp. Example 1 | 100.0 | — | — | — | — | — | — | — |
| Comp. Example 2 | — | — | — | 100.0 | — | — | — | — |
| Comp. Example 3 | 24.0 | — | — | 70.0 | 6.0 | — | — | — |
| Comp. Example 4 | 40.0 | — | — | 50.0 | 10.0 | — | — | — |
| Comp. Example 5 | 80.0 | — | — | 10.0 | 10.0 | — | — | — |
| Comp. Example 6 | 28.2 | — | — | 70.0 | — | 1.8 | — | — |
| Comp. | 47.0 | — | — | 50.0 | — | 3.0 | — | — |

TABLE 1-1-continued

| Example and Comp. Example | (a-1), (a-2) SPS Preparation Example (wt %) | | | (b) Polyamide 2015B (wt %) | (c-1)(c-2) Rubber G-1651 (wt %) | (d-1), (d-2) Compatibilizer Preparation Example (wt %) | | |
|---|---|---|---|---|---|---|---|---|
| | 1 | 3 | 3A | | | 3 | 3A | 4 |
| Example 7 | | | | | | | | |
| Comp. Example 8 | 87.0 | — | — | 10.0 | — | 3.0 | — | — |
| Comp. Example 9 | 28.2 | — | — | 70.0 | — | — | — | 1.8 |
| Comp. Example 10 | 47.0 | — | — | 50.0 | — | — | — | 3.0 |
| Comp. Example 11 | 87.0 | — | — | 10.0 | — | — | — | 3.0 |
| Comp. Example 12 | — | 30.0 | — | 70.0 | — | — | — | — |
| Comp. Example 49 | 7.2 | — | — | 85.0 | 6.0 | 1.8 | — | — |
| Comp. Example 50 | 89.2 | — | — | 3.0 | 6.0 | 1.8 | — | — |

TABLE 1-1-continued

| Example and Comp. Example | (a-1), (a-2) SPS Preparation Example (wt %) | | | (b) Polyamide 2015B (wt %) | (c-1)(c-2) Rubber G-1651 (wt %) | (d-1), (d-2) Compatibilizer Preparation Example (wt %) | | |
|---|---|---|---|---|---|---|---|---|
| | 1 | 3 | 3A | | | 3 | 3A | 4 |
| Example | | | | | | | | |
| Comp. Example 51 | 2.0 | — | — | 85.0 | 10.0 | — | — | 3.0 |
| Comp. Example 52 | 84.0 | — | — | 3.0 | 10.0 | — | — | 3.0 |
| Comp. Example 53 | 2.0 | — | — | 85.0 | 10.0 | — | 3.0 | — |
| Comp. Example 54 | 84.0 | — | — | 3.0 | 10.0 | — | 3.0 | — |

TABLE 1-2

| Example and Comp. Example | Physical properties after conditioning After 24 Hrs at 23° C. 50% humidity | | | | Water absorption and physical properties after absorption of water After 24 Hrs in water at 23° C. | |
|---|---|---|---|---|---|---|
| | Izod impact strength (kJ/m$^2$) | Elongation (%) | Flexural modulus of elasticity (MPa) | Heat distortion temperature (°C.) | Water absorption (%) | Flexural modulus of elasticity (MPa) |
| Example 1 | 9.0 | 30 | 2400 | 188 | 0.55 | 1880 |
| Example 2 | 5.9 | 24 | 2660 | 140 | 0.40 | 2060 |
| Example 3 | 7.2 | 14 | 3100 | 128 | 0.08 | 2940 |
| Example 4 | 9.6 | 32 | 2440 | 190 | 0.60 | 1880 |
| Example 5 | 6.5 | 28 | 2660 | 145 | 0.42 | 2030 |
| Example 6 | 8.6 | 14 | 3000 | 137 | 0.08 | 2910 |
| Example 7 | 9.5 | 35 | 2570 | 175 | 0.60 | 1920 |
| Example 8 | 9.3 | 28 | 2500 | 195 | 0.58 | 1910 |
| Example 31 | 9.0 | 27 | 2270 | 189 | 0.60 | 1790 |
| Example 32 | 13.8 | 22 | 2770 | 142 | 0.42 | 2170 |
| Example 33 | 7.9 | 15 | 3000 | 130 | 0.10 | 2890 |
| Example 34 | 11.1 | 30 | 2480 | 178 | 0.63 | 2030 |
| Comp. Example 1 | 1.2 | 2 | 3410 | 138 | 0.01 | 3400 |
| Comp. Example 2 | 5.9 | 34 | 2520 | 224 | 1.10 | 1470 |

TABLE 1-2-continued

| Example and Comp. Example | Physical properties after conditioning After 24 Hrs at 23° C. 50% humidity | | | | Water absorption and physical properties after absorption of water After 24 Hrs in water at 23° C. | |
|---|---|---|---|---|---|---|
| | Izod impact strength (kJ/m²) | Elongation (%) | Flexural modulus of elasticity (MPa) | Heat distortion temperature (°C.) | Water absorption (%) | Flexural modulus of elasticity (MPa) |
| Comp. Example 3 | 6.0 | 8 | 2290 | 192 | 0.79 | 1530 |
| Comp. Example 4 | 4.5 | 3 | 2380 | 136 | 0.57 | 1780 |
| Comp. Example 5 | 2.2 | 4 | 2670 | 123 | 0.13 | 2500 |
| Comp. Example 6 | 2.4 | 7 | 2810 | 203 | 0.74 | 2010 |
| Comp. Example 7 | 1.3 | 4 | 3100 | 148 | 0.44 | 2350 |
| Comp. Example 8 | 1.3 | 2 | 3290 | 138 | 0.11 | 3140 |
| Comp. Example 9 | 3.0 | 5 | 2950 | 198 | 0.79 | 1975 |
| Comp. Example 10 | 1.7 | 4 | 3090 | 161 | 0.51 | 2260 |
| Comp. Example 11 | 1.1 | 3 | 3350 | 142 | 0.10 | 3100 |
| Comp. Example 12 | 2.6 | 5 | 2800 | 195 | 0.77 | 2040 |
| Comp. Example 49 | 6.7 | 29 | 2350 | 194 | 0.92 | 1620 |
| Comp. Example 50 | 1.1 | 3 | 2900 | 134 | 0.04 | 2980 |
| Comp. Example 51 | 2.8 | 5 | 2840 | 188 | 0.93 | 2040 |
| Comp. Example 52 | 1.4 | 2 | 3060 | 138 | 0.04 | 2850 |
| Comp. Example 53 | 2.6 | 6 | 2810 | 185 | 0.93 | 2000 |
| Comp. Example 54 | 1.3 | 2 | 3140 | 136 | 0.03 | 2990 |

TABLE 1-3

| Example and Comp. Example | Blending Resin (100 parts by weight) | | | |
|---|---|---|---|---|
| | (a-1), (a-2) SPS Preparation Example 1 (wt %) | (b) Polyamide 2015B (wt %) | (c-1)(c-2) Rubber S-2001 (wt %) | (d-1), (d-2) Compatibilizer Modified PPO in Preparation Example 4 (wt %) |
| Example 5A | 37.0 | 50.0 | 10.0 | 3.0 |
| Example 6A | 77.0 | 10.0 | 10.0 | 3.0 |
| Example 8A | 22.2 | 70.0 | 6.0 | 1.8 |
| Comp. Example 30A | 2.0 | 85.0 | 10.0 | 3.0 |
| Comp. Example 31A | 84.0 | 3.0 | 10.0 | 3.0 |

TABLE 1-4

|  | Physical properties after conditioning After 24 Hrs at 23° C. 50% humidity | | | | Water absorption and physical properties after absorption of water After 24 Hrs in water at 23° C. | |
|---|---|---|---|---|---|---|
| Example and Comp. Example | Izod impact strength (kJ/m²) | Elongation (%) | Flexural modulus of elasticity (MPa) | Heat distortion temperature (°C.) | Water absorption (%) | Flexural modulus of elasticity (MPa) |
| Example 5a | 10.5 | 22 | 2710 | 160 | 0.41 | 2160 |
| Example 6A | 9.5 | 17 | 3080 | 137 | 0.08 | 2970 |
| Example 8A | 9.5 | 26 | 2550 | 200 | 0.57 | 1950 |
| Comp. Example 30A | 2.7 | 6 | 2840 | 197 | 0.87 | 2040 |
| Comp. Example 31A | 1.4 | 2 | 3100 | 141 | 0.03 | 2900 |

As is clear from Table 1, it is possible, according to the present invention, to obtain a heat resistant and water resistant resin composition markedly improved in impact strength and elongation as compared with the resin composition blended in the component (b) only with the components (a-1) and (c-1) or the components (a-1) and (d-1) or the component (a-2).

EXAMPLE 9

To 100 parts by weight of the mixture comprising 22.2% by weight of SPS in Preparation Example 1 (weight-average molecular weight of 320,000, weight-average molecular weight Mw/number-average molecular weight Mn of 2.60), 70% by weight of polyamide 66 (produced by Ube Industried Ltd. under the trade name "2015B"), 6.0% by weight of SEBS as a rubbery elastomer (produced by Shell Kagaku K.K. under the trade name "Kraton G-1651"), and 1.8% by weight of maleic anyhydride-modified SPS in Preparation Example 3 as a compatibilizer were added 0.1 part by weight of (2,6-di-tert-butyl-4-methylphenyl)pentaerythritol diphosphite (produced by Adeka Argus Co., Ltd. under the trade name "PEP-36") as an antioxidant and 0.1 part by weight of tetrakis [methylene-3-(3',5'-di-tert-butyl-4'-hydroxyphenyl)] propionate (produced by Adeka Argus Co., Ltd. under the trade name "MARK AO60") also as an antioxidant, and the resultant mixture was dry-blended with a Henschel mixer. Subsequently the blend was incorporated with 43 parts by weight of glass fiber by side feeding, melt kneaded and pelletized with a twin-screw extruder. The pellet thus obtained was injection molded to produce test pieces for tensile test, flexural test and Izod impact test, respectively. Measurements were made of Izod impact strength, elongation, modulus of elasticity and heat distortion temperature of the test pieces thus obtained. The results are given in Table 1.

EXAMPLES 10 & 11

The procedure in Example 9 was repeated except that the blend composition was altered as given in Table 2. The results are given in Table 2.

EXAMPLE 12

The procedure in Example 9 was repeated except that 1.8% by weight of the maleic anhydride-modified polyphenylene ether in Preparation Example 4 was used as a compatibilizer in the component (d-1). The results are given in Table 2.

EXAMPLE 12A

The procedure in Example 12 was repeated except that MASS of core shell type (produced by Mitsubishi Rayon Co., Ltd. under the trade name "S-2001") was used in place of SEBS (produced by Shell Kagaku K.K. under the trade name "G-1651"). The results are given in Table 2.

EXAMPLE 13

The procedure in Example 12 was repeated except that the blend composition was altered as given in Table 1. The results are given in Table 2.

EXAMPLE 13A

The procedure in Example 13 was repeated except that MASS of core shell type (produced by Mitsubishi Rayon Co., Ltd. under the trade name "S-2001") was used in place of SEBS (produced by Shell Kagaku K.K. under the trade name "G-1651"). The results are given in Table 2.

EXAMPLE 14

The procedure in Example 12 was repeated except that the blend composition was altered as given in Table 2. The results are given in Table 2.

EXAMPLE 14A

The procedure in Example 14 was repeated except that MASS of core shell type (produced by Mitsubishi Rayon Co., Ltd. under the trade name "S-2001") was used in place of SEBS (produced by Shell Kagaku K.K. under the trade name "G-1651"). The results are given in Table 2.

EXAMPLE 15

The procedure in Example 9 was repeated except that 24.0% by weight of the maleic anhydride-modified SPS in Preparation Example 3 was used as the component (a-2). The results are given in Table 2.

Comparative Examples 13 & 14

The procedure in Example 9 was repeated except that SPS and polyamide were used in an amount of 100% by weight, respectively. The results are given in Table 2.

Comparative Examples 15 to 17

The procedure in Example 9 was repeated except that a compatibilizer as the component (d-1) was not incorporated and that the blend composition was altered as given in Table 2. The results are given in Table 2.

Comparative Examples 18 to 23

The procedure in Example 9 or 12 was repeated except that a rubbery elastomer as the component (c-1) was not incorporated and that the blend composition was altered as given in Table 2. The results are given in Table 2.

Comparative Example 24

The procedure in Example 15 was repeated except that a rubbery elastomer as the component (c-2) was not incorporated and that the blend composition was altered as given in Table 2. The results are given in Table 2.

TABLE 2-1

| | Blending | | | | | | | | |
|---|---|---|---|---|---|---|---|---|---|
| | Resin (100 parts by weight) | | | | | | | | |
| | (a-1), (a-2) SPS Preparation Example (wt %) | | | (b) Polyamide 2015B | (c-1)(c-2) Rubber G-1651 | (d-1), (d-2) Compatibilizer Preparation Example (wt %) | | | Filler (e) Glass fiber |
| Example and Comp. Example | 1 | 3 | 3A | (wt %) | (wt %) | 3 | 3A | 4 | (parts by weight) |
| Example 9 | 22.2 | — | — | 70.0 | 6.0 | 1.8 | — | — | 43.0 |
| Example 10 | 37.0 | — | — | 50.0 | 10.0 | 3.0 | — | — | 43.0 |
| Example 11 | 77.0 | — | — | 10.0 | 10.0 | 3.0 | — | — | 43.0 |
| Example 12 | 22.2 | — | — | 70.0 | 6.0 | — | — | 1.8 | 43.0 |
| Example 13 | 37.0 | — | — | 50.0 | 10.0 | — | — | 3.0 | 43.0 |
| Example 14 | 77.0 | — | — | 10.0 | 10.0 | — | — | 3.0 | 43.0 |
| Example 15 | — | 24.0 | — | 70.0 | 6.0 | — | — | — | 43.0 |
| Example 34 | 22.2 | — | — | 70.0 | 6.0 | — | 1.8 | — | 43.0 |
| Example 35 | 37.0 | — | — | 50.0 | 10.0 | — | 3.0 | — | 43.0 |
| Example 36 | 77.0 | — | — | 10.0 | 10.0 | — | 3.0 | — | 43.0 |
| Example 37 | — | — | 24.0 | 70.0 | 6.0 | — | — | — | 43.0 |
| Comp. Example 13 | 100.0 | — | — | — | — | — | — | — | 43.0 |
| Comp. Example 14 | — | — | — | 100.0 | — | — | — | — | 43.0 |
| Comp. Example 15 | 24.0 | — | — | 70.0 | 6.0 | — | — | — | 43.0 |
| Comp. Example 16 | 40.0 | — | — | 50.0 | 10.0 | — | — | — | 43.0 |
| Comp. Example 17 | 80.0 | — | — | 10.0 | 10.0 | — | — | — | 43.0 |
| Comp. Example 18 | 28.2 | — | — | 70.0 | — | 1.8 | — | — | 43.0 |
| Comp. Example 19 | 47.0 | — | — | 50.0 | — | 3.0 | — | — | 43.0 |
| Comp. Example 20 | 87.0 | — | — | 10.0 | — | 3.0 | — | — | 43.0 |
| Comp. Example 21 | 28.2 | — | — | 70.0 | — | — | — | 1.8 | 43.0 |
| Comp. Example 22 | 47.0 | — | — | 50.0 | — | — | — | 3.0 | 43.0 |
| Comp. Example 23 | 87.0 | — | — | 10.0 | — | — | — | 3.0 | 43.0 |
| Comp. Example 24 | — | 30.0 | — | 70.0 | — | — | — | — | 43.0 |

TABLE 2-2

| | Physical properties after conditioning After 24 Hrs at 23° C. 50% humidity | | | | Water absorption and physical properties after absorption of water After 24 Hrs in water at 23° C. | |
|---|---|---|---|---|---|---|
| Example and Comp. Example | Izod impact strength (kJ/m$^2$) | Elongation (%) | Flexural modulus of elasticity (MPa) | Heat distortion temperature (°C.) | Water absorption (%) | Flexural modulus of elasticity (MPa) |
| Example 9 | 12.0 | 3.6 | 9030 | 236 | 0.49 | 6710 |
| Example 10 | 10.4 | 3.2 | 9640 | 224 | 0.39 | 7540 |
| Example 11 | 9.4 | 2.6 | 9850 | 209 | 0.10 | 9600 |

TABLE 2-2-continued

|  | Physical properties after conditioning After 24 Hrs at 23° C. 50% humidity | | | | Water absorption and physical properties after absorption of water After 24 Hrs in water at 23° C. | |
|---|---|---|---|---|---|---|
| Example and Comp. Example | Izod impact strength (kJ/m$^2$) | Elongation (%) | Flexural modulus of elasticity (MPa) | Heat distortion temperature (°C.) | Water absorption (%) | Flexural modulus of elasticity (MPa) |
| Example 12 | 12.9 | 3.8 | 9010 | 238 | 0.47 | 6530 |
| Example 13 | 11.0 | 3.6 | 9580 | 227 | 0.36 | 7310 |
| Example 14 | 10.1 | 2.6 | 9770 | 212 | 0.07 | 9670 |
| Example 15 | 13.0 | 3.8 | 9130 | 202 | 0.54 | 6840 |
| Example 34 | 14.8 | 3.8 | 9450 | 235 | 0.49 | 6520 |
| Example 35 | 13.2 | 3.3 | 9970 | 225 | 0.42 | 7600 |
| Example 36 | 11.5 | 2.6 | 10100 | 214 | 0.13 | 9870 |
| Example 37 | 15.2 | 3.9 | 9200 | 203 | 0.59 | 7030 |
| Comp. Example 13 | 4.5 | 0.8 | 10310 | 210 | 0.04 | 10220 |
| Comp. Example 14 | 10.1 | 3.5 | 8500 | 250 | 0.71 | 4870 |
| Comp. Example 15 | 7.2 | 2.1 | 8800 | 230 | 0.61 | 5210 |
| Comp. Example 16 | 4.4 | 1.6 | 8960 | 214 | 0.47 | 6320 |
| Comp. Example 17 | 4.1 | 1.3 | 9150 | 199 | 0.19 | 8700 |
| Comp. Example 18 | 9.8 | 2.9 | 9200 | 240 | 0.53 | 7020 |
| Comp. Example 19 | 9.1 | 2.4 | 9730 | 234 | 0.44 | 7740 |
| Comp. Example 20 | 6.9 | 1.1 | 10250 | 225 | 0.12 | 9860 |
| Comp. Example 21 | 9.3 | 3.0 | 9250 | 251 | 0.55 | 6990 |
| Comp. Example 22 | 8.6 | 2.6 | 9910 | 245 | 0.41 | 7540 |
| Comp. Example 23 | 7.4 | 1.5 | 10100 | 248 | 0.10 | 9900 |
| Comp. Example 24 | 9.5 | 3.0 | 9330 | 211 | 0.60 | 7210 |

TABLE 2-3

| | Blending | | | | |
|---|---|---|---|---|---|
| | Resin (100 parts by weight) | | | | |
| Example and Comp. Example | (a-1), (a-2) SPS Preparation Example 1 (wt %) | (b) Polyamide 2015B (wt %) | (c-1)(c-2) Rubber S-2001 (wt %) | (d-1), (d-2) Compatibilizer Modified PPO in Preparation Example 4 (wt %) | Filler (e) Glass fiber (parts by weight) |
| Example 12A | 22.2 | 70 | 6.0 | 1.8 | 43.0 |
| Example 13A | 37.0 | 50.0 | 10.0 | 3.0 | 43.0 |
| Example 14A | 77.0 | 10.0 | 10.0 | 3.0 | 43.0 |
| Comp. Example 32A | 2.0 | 85.0 | 10.0 | 3.0 | 43.0 |
| Comp. Example 33A | 84.0 | 3.0 | 10.0 | 3.0 | 43.0 |

TABLE 2-4

| Example and Comp. Example | Physical properties after conditioning After 24 Hrs at 23° C. 50% humidity | | | | Water absorption and physical properties after absorption of water After 24 Hrs in water at 23° C. | |
|---|---|---|---|---|---|---|
| | Izod impact strength (kJ/m$^2$) | Elongation (%) | Flexural modulus of elasticity (MPa) | Heat distortion temperature (°C.) | Water absorption (%) | Flexural modulus of elasticity (MPa) |
| Example 12A | 13.3 | 3.9 | 9020 | 245 | 0.45 | 6500 |
| Example 13A | 11.5 | 3.6 | 9580 | 235 | 0.34 | 7350 |
| Example 14A | 11.0 | 2.5 | 9790 | 233 | 0.07 | 9700 |
| Comp. Example 32A | 9.2 | 3.0 | 8800 | 249 | 0.89 | 5100 |
| Comp. Example 33A | 7.3 | 1.2 | 9830 | 248 | 0.04 | 9180 |

As is clear from Table 2, it is possible, according to the present invention, to obtain a heat resistant and water resistant resin composition markedly improved in impact strength and elongation as compared with the resin composition blended in the component (b) only with the components (a-1) and (c-1) or the components (a-1) and (d-1) or the component (a-2).

EXAMPLE 16

To 100 parts by weight of the mixture comprising 22.2% by weight of SPS in Preparation Example 1 (weight-average molecular weight of 320,000, weight-average molecular weight Mw/number-average molecular weight Mn of 2.60), 70% by weight of polyamide 66 (produced by Ube Industries Ltd. under the trade name "2015B"), 6.0% by weight of maleic anhydride-modified SEBS as a rubbery elastomer having a polar group (produced by Asahi Chemical Industry Co., Ltd. under the trade name "MX-072"), and 1.8% by weight of maleic anhydride-modified SPS in Preparation Example 3 as a compatibilizer were added 0.1 part by weight of (2,6-di-tert-butyl-4-methylphenyl)pentaerythritol diphosphite (produced by Adeka Argus Co., Ltd. under the trade name "PEP-36") as an antioxidant and 0.1 part by weight of tetrakis [methylene-3-(3',5'-di-tert-butyl-4'-hydroxyphenyl)] propionate (produced by Adeka Argus Co., Ltd. under the trade name "MARK AO60") also as an antioxidant, and the resultant mixture was dry-blended with a Henschel mixer. Subsequently the blend was melt kneaded and pelletized with a twin-screw extruder. The pellet thus obtained was injection molded to produce test pieces for tensile test, flexural test and Izod impact test, respectively. Measurements were made of Izod impact strength, elongation, modulus of elasticity and heat distortion temperature of the test pieces thus obtained. The results are given in Table 3.

EXAMPLES 17 & 18

The procedure in Example 16 was repeated except that the blend composition was altered as given in Table 3. The results are given in Table 3.

EXAMPLE 19

The procedure in Example 16 was repeated except that 1.8% by weight of the maleic anhydride-modified polyphenylene ether in Preparation Example 4 was used as a compatibilizer in the component (d-1). The results are given in Table 3.

EXAMPLE 20

The procedure in Example 19 was repeated except that the blend composition was altered as given in Table 3. The results are given in Table 3.

EXAMPLES 20A, 20B, 20C, 20D

The procedure in Example 20 was repeated except that a part of the maleic anhydride-modified SEBS (produced by Asahi Chemical Industry Co., Ltd. under the trade name "MX-072") was replaced with MASS of core shell type (produced by Mitsubishi Rayon Co., Ltd. under the trade name "S-2001") which was unmodified rubber. The results are given in Table 3.

EXAMPLE 20E

The procedure in Example 20 was repeated except that a half of the maleic anhydride-modified SEBS (produced by Asahi Chemical Industry Co., Ltd. under the trade name "MX-072") was replaced with SEBS (produced by Shell Kagaku K.K. under the trade name "Kraton G-1651") which was unmodified rubber. The results are given in Table 3.

EXAMPLE 21

The procedure in Example 19 was repeated except that the blend composition was altered as given in Table 3. The results are given in Table 3.

EXAMPLE 21A

The procedure in Example 21 was repeated except that a half of the maleic anhydride-modified SEBS (produced by Asahi Chemical Industry Co., Ltd. under the trade name "MX-072") was replaced with MASS of core shell type (produced by Mitsubishi Rayon Co., Ltd. under the trade name "5-2001") which was unmodified rubber. The results are given in Table 3.

Table 21B

The procedure in Example 21 was repeated except that a half of the maleic anhydride-modified SEBS (produced by Asahi Chemical Industry Co., Ltd. under the trade name "MX-072") was replaced with SEBS (produced by Shell Kagaku K.K. under the trade name "Kraton G-1651") which was unmodified rubber. The results are given in Table 3.

EXAMPLE 22

The procedure in Example 16 was repeated except that 24.0% by weight of the maleic anhydride-modified SPS in Preparation Example 3 was used as the component (a-2). The results are given in Table 3.

EXAMPLE 23

The procedure in Example 19 was repeated except that there was used 0.5 part by weight of sodium-2,2'-methylenebis(4,6-di-tert-butylphenyl)phosphate (produced by Adeka Argus Chemical Co., Ltd. under the trade name "NA-11") as a nucleating agent in addition to 100 parts by weight of the composition in Example 19. The results are given in Table 3.

EXAMPLE 23A

The procedure in Example 23 was repeated except that a half of the maleic anhydride-modified SEBS (produced by Asahi Chemical Industry Co., Ltd. under the trade name "MX-072") was replaced with MASS of core shell type (produced by Mitsubishi Rayon Co., Ltd. under the trade name "S-2001") which was unmodified rubber. The results are given in Table 3.

EXAMPLE 23B

The procedure in Example 23 was repeated except that a half of the maleic anhydride-modified SEBS (produced by Asahi Chemical Industry Co., Ltd. under the trade name "MX-072") was replaced with SEBS (produced by Shell Kagaku K.K. under the trade name "Kraton G-1651") which was unmodified rubber. The results are given in Table 3.

Comparative Examples 25 & 26

The procedure in Example 16 was repeated except that SPS and polyamide were used in an amount of 100% by weight, respectively. The results are given in Table 3.

Comparative Examples 27 to 29

The procedure in Example 16 was repeated except that a compatibilizer as the component (d-1) was not incorporated and that the blend composition was altered as given in Table 3. The results are given in Table 3.

Comparative Examples 30 to 35

The procedure in Example 16 or 19 was repeated except that a rubbery elastomer as the component (c-3) was not incorporated and that the blend composition was altered as given in Table 3. The results are given in Table 3.

Comparative Example 26

The procedure in Example 22 was repeated except that a rubbery elastomer as the component (c-4) was not incorporated and that the blend composition was altered as given in Table 3. The results are given in Table 3.

TABLE 3-1

| Example and Comp. Example | (a-1), (a-2) SPS Preparation Example (wt %) | | | (b) Polyamide 2015B (wt %) | (c-3)(c-4) Rubber MX-072 (wt %) | (d-1), (d-2) Compatibilizer Preparation Example (wt %) | | |
|---|---|---|---|---|---|---|---|---|
| | 1 | 3 | 3A | | | 3 | 3A | 4 |
| Example 16 | 22.2 | — | — | 70.0 | 6.0 | 1.8 | — | — |
| Example 17 | 37.0 | — | — | 50.0 | 10.0 | 3.0 | — | — |
| Example 18 | 77.0 | — | — | 10.0 | 10.0 | 3.0 | — | — |
| Example 19 | 22.2 | — | — | 70.0 | 6.0 | — | — | 1.8 |
| Example 20 | 37.0 | — | — | 50.0 | 10.0 | — | — | 3.0 |
| Example 21 | 77.0 | — | — | 10.0 | 10.0 | — | — | 3.0 |
| Example 22 | — | 24.0 | — | 70.0 | 6.0 | — | — | — |
| Example 23 | 22.2 | — | — | 70.0 | 6.0 | — | — | 1.8 |
| Example 39 | 22.2 | — | — | 70.0 | 6.0 | — | 1.8 | — |
| Example 40 | 37.0 | — | — | 50.0 | 10.0 | — | 3.0 | — |
| Example 41 | 77.0 | — | — | 10.0 | 10.0 | — | 3.0 | — |
| Example 42 | — | — | 24.0 | 70.0 | 6.0 | — | — | — |
| Comp. Example 25 | 100.0 | — | — | — | — | — | — | — |
| Comp. Example 26 | — | — | — | 100.0 | — | — | — | — |
| Comp. Example 27 | 24.0 | — | — | 70.0 | 6.0 | — | — | — |
| Comp. Example 28 | 40.0 | — | — | 50.0 | 10.0 | — | — | — |
| Comp. Example 29 | 80.0 | — | — | 10.0 | 10.0 | — | — | — |
| Comp. Example 30 | 28.2 | — | — | 70.0 | — | 1.8 | — | — |
| Comp. Example 31 | 47.0 | — | — | 50.0 | — | 3.0 | — | — |
| Comp. Example 32 | 87.0 | — | — | 10.0 | — | 3.0 | — | — |
| Comp. Example 33 | 28.2 | — | — | 70.0 | — | — | — | 1.8 |
| Comp. Example 34 | 47.0 | — | — | 50.0 | — | — | — | 3.0 |
| Comp. Example 35 | 87.0 | — | — | 10.0 | — | — | — | 3.0 |
| Comp. | — | 30.0 | — | 70.0 | — | — | — | — |

TABLE 3-1-continued

| Example and Comp. Example | Blending Resin (100 parts by weight) | | | | | | | |
|---|---|---|---|---|---|---|---|---|
| | (a-1), (a-2) SPS Preparation Example (wt %) | | | (b) Polyamide 2015B | (c-3)(c-4) Rubber MX-072 | (d-1), (d-2) Compatibilizer Preparation Example (wt %) | | |
| | 1 | 3 | 3A | (wt %) | (wt %) | 3 | 3A | 4 |
| Example 36 | | | | | | | | |
| Comp. Example 55 | 7.2 | — | — | 85.0 | 6.0 | 1.8 | — | — |
| Comp. Example 56 | 89.2 | — | — | 3.0 | 6.0 | 1.8 | — | — |
| Comp. Example 57 | 2.0 | — | — | 85.0 | 10.0 | — | — | 3.0 |
| Comp. Example 58 | 84.0 | — | — | 3.0 | 10.0 | — | — | 3.0 |
| Comp. Example 59 | 2.0 | — | — | 85.0 | 10.0 | — | 3.0 | — |
| Comp. Example 60 | 84.0 | — | — | 3.0 | 10.0 | — | 3.0 | — |

TABLE 3-2

| Example and Comp. Example | Physical properties after conditioning After 24 Hrs at 23° C., 50% humidity | | | | Water absorption and physical properties after absorption of water After 24 Hrs in water at 23° C. | |
|---|---|---|---|---|---|---|
| | Izod impact strength (kJ/m$^2$) | Elongation (%) | Flexural modulus of elasticity (MPa) | Heat distortion temperature (°C.) | Water absorption (%) | Flexural modulus of elasticity (MPa) |
| Example 16 | 9.5 | 28 | 2390 | 189 | 0.58 | 1880 |
| Example 17 | 13.4 | 21 | 2690 | 141 | 0.42 | 2110 |
| Example 18 | 8.1 | 15 | 3100 | 130 | 0.09 | 2980 |
| Example 19 | 10.0 | 23 | 2460 | 195 | 0.61 | 1860 |
| Example 20 | 14.2 | 21 | 2650 | 153 | 0.45 | 2050 |
| Example 21 | 9.8 | 18 | 3010 | 135 | 0.09 | 2890 |
| Example 22 | 11.3 | 31 | 2510 | 178 | 0.60 | 1930 |
| Example 23 | 9.8 | 21 | 2500 | 201 | 0.60 | 1910 |
| Example 39 | 9.6 | 29 | 2330 | 189 | 0.58 | 1820 |
| Example 40 | 13.7 | 21 | 2720 | 140 | 0.43 | 2010 |
| Example 41 | 7.9 | 15 | 3040 | 131 | 0.07 | 3010 |
| Example 42 | 11.6 | 30 | 2540 | 201 | 0.61 | 1990 |
| Comp. Example 25 | 1.2 | 2 | 3410 | 138 | 0.01 | 3400 |
| Comp. Example 26 | 5.9 | 34 | 2520 | 224 | 1.10 | 1470 |
| Comp. Example 27 | 7.1 | 9 | 2310 | 189 | 0.80 | 1550 |
| Comp. Example 28 | 5.0 | 3 | 2400 | 134 | 0.55 | 1810 |
| Comp. Example 29 | 1.8 | 2 | 2790 | 118 | 0.15 | 2460 |
| Comp. Example 30 | 2.4 | 7 | 2810 | 203 | 0.74 | 2010 |
| Comp. Example 31 | 1.3 | 4 | 3100 | 148 | 0.44 | 2350 |
| Comp. Example 32 | 1.3 | 2 | 3290 | 138 | 0.11 | 3140 |
| Comp. Example 33 | 3.0 | 5 | 2950 | 198 | 0.79 | 1975 |
| Comp. Example 34 | 1.7 | 4 | 3090 | 161 | 0.51 | 2260 |
| Comp. Example 35 | 1.1 | 3 | 3350 | 142 | 0.10 | 3100 |
| Comp. Example 36 | 2.6 | 5 | 2800 | 195 | 0.77 | 2040 |
| Comp. Example 55 | 2.2 | 5 | 2910 | 191 | 0.90 | 2080 |
| Comp. Example 56 | 1.4 | 3 | 3130 | 134 | 0.03 | 2950 |
| Comp. Example 57 | 2.4 | 7 | 2920 | 200 | 0.91 | 2100 |

TABLE 3-2-continued

| Example and Comp. Example | Physical properties after conditioning After 24 Hrs at 23° C., 50% humidity | | | | Water absorption and physical properties after absorption of water After 24 Hrs in water at 23° C. | |
|---|---|---|---|---|---|---|
| | Izod impact strength (kJ/m$^2$) | Elongation (%) | Flexural modulus of elasticity (MPa) | Heat distortion temperature (°C.) | Water absorption (%) | Flexural modulus of elasticity (MPa) |
| Comp. Example 58 | 1.2 | 3 | 2990 | 139 | 0.04 | 2780 |
| Comp. Example 59 | 3.1 | 7 | 2860 | 188 | 0.89 | 2090 |
| Comp. Example 60 | 1.3 | 2 | 3020 | 135 | 0.02 | 2830 |

TABLE 3-3

| | Blending Resin (100 parts by weight) | | | | |
|---|---|---|---|---|---|
| | (a-1), (a-2) | | (c-3), (c-4) | | (d-1), (d-2) |
| Example and Comp. Example | SPS Preparation Example 1 (wt %) | (b) Polyamide 2015B (wt %) | Rubber MX-072 (wt %) | Rubber used in combination S-2001 or G-1651 (wt %) | Compatibilizer Modified PPO in Preparation Example 4 (wt %) |
| Example 20A | 37.0 | 50.0 | 8.0 | 2.0 (S-2001) | 3.0 |
| Example 20B | 37.0 | 50.0 | 5.0 | 5.0 (S-2001) | 3.0 |
| Example 20C | 37.0 | 50.0 | 5.0 | 5.0 (S-2001) | 3.0* |
| Example 20D | 37.0 | 50.0 | 2.0 | 8.0 (S-2001) | 3.0 |
| Example 20E | 37.0 | 50.0 | 5.0 | 5.0 (G-1651) | 3.0 |
| Example 21A | 77.0 | 10.0 | 5.0 | 5.0 (S-2001) | 3.0 |
| Example 21B | 77.0 | 10.0 | 5.0 | 5.0 (G-1651) | 3.0 |
| Example 23A | 22.2 | 10.0 | 3.0 | 3.0 (S-2001) | 1.8 |
| Example 23B | 22.2 | 10.0 | 3.0 | 5.0 (G-1651) | 1.8 |

(Note) *Maleic acid-modified SPS as obtained in Preparation Example 3 was used in place of modified PPO

TABLE 3-4

| Example and Comp. Example | Physical properties after conditioning After 24 Hrs at 23° C., 50% humidity | | | | Water absorption and physical properties after absorption of water After 24 Hrs in water at 23° C. | |
|---|---|---|---|---|---|---|
| | Izod impact strength (kJ/m$^2$) | Elongation (%) | Flexural modulus of elasticity (MPa) | Heat distortion temperature (°C.) | Water absorption (%) | Flexural modulus of elasticity (MPa) |
| Example 20A | 14.7 | 25 | 2650 | 155 | 0.44 | 2110 |
| Example 20B | 15.6 | 35 | 2700 | 157 | 0.43 | 2150 |
| Example 20C | 14.4 | 29 | 2700 | 145 | 0.43 | 2130 |
| Example 20D | 13.4 | 27 | 2680 | 150 | 0.41 | 2160 |
| Example 20E | 10.8 | 30 | 2650 | 153 | 0.42 | 2080 |
| Example 21A | 11.0 | 22 | 3050 | 137 | 0.08 | 2950 |
| Example 21B | 10.2 | 19 | 3010 | 139 | 0.08 | 2930 |
| Example 23A | 11.5 | 29 | 2520 | 197 | 0.58 | 1920 |
| Example 23B | 11.0 | 26 | 2490 | 197 | 0.58 | 1920 |

As is clear from Table 3, it is possible, according to the present invention, to obtain a heat resistant and water resistant resin composition markedly improved in impact strength and elongation as compared with the resin composition blended in the component (b) only with the components (a-1) and (c-3) or the components (a-1) and (d-1) or the component (a-2).

EXAMPLE 24

To 100 parts by weight of the mixture comprising 22.2% by weight of SPS in Preparation Example 1 (weight-average molecular weight of 320,000, weight-average molecular weight Mw/number-average molecular weight Mn of 2.60), 70% by weight of polyamide 66 (produced by Ube Industries Ltd. under the trade name "2015B"), 6.0% by weight of maleic anhydride-modified SEBS as a rubbery elastomer having a polar group (produced by Asahi Chemical Industry Co., Ltd. under the trade name "MX-072"), and 1.8% by weight of maleic anhydride-modified SPS in Preparation Example 3 as a compatibilizer were added 0.1 part by weight of (2,6-di-tert-butyl-4-methylphenyl)pentaerythritol diphosphite (produced by Adeka Argus Co., Ltd. under the trade name "PEP-36") as an antioxidant and 0.1 part by weight of tetrakis [methylene-3-(3',5'-di-tert-butyl-4'-hydroxyphenyl)] propionate (produced by Adeka Argus Co., Ltd. under the trade name "MARK AO60") also as an antioxidant, and the resultant mixture was dry-blended with a Henschel mixer. Subsequently the blend was incorporated with 43 parts by weight of glass fiber by side feeding, melt kneaded and pelletized with a twin-screw extruder. The pellet thus obtained was injection molded to produce test pieces for tensile test, flexural test and Izod impact test, respectively. Measurements were made of Izod impact strength, elongation, modulus of elasticity and heat distortion temperature of the test pieces thus obtained. The results are given in Table 4.

EXAMPLES 25 & 26

The procedure in Example 24 was repeated except that the blend composition was altered as given in Table 4. The results are given in Table 4.

EXAMPLE 27

The procedure in Example 24 was repeated except that 1.8% by weight of the maleic anhydride-modified polyphenylene ether in Preparation Example 4 was used as a compatibilizer in the component (d-1). The results are given in Table 4.

EXAMPLE 27A

The procedure in Example 27 was repeated except that a half of the maleic anhydride-modified SEBS (produced by Asahi Chemical Industry Co., Ltd. under the trade name "MX-072") was replaced with MASS of core shell type (produced by Mitsubishi Rayon Co., Ltd. under the trade name "S-2001") which was unmodified rubber. The results are given in Table 4.

EXAMPLE 27B

The procedure in Example 27 was repeated except that a half of the maleic anhydride-modified SEBS (produced by Asahi Chemical Industry Co., Ltd. under the trade name "MX-072") was replaced with SEBS (produced by Shell Kagaku K.K. under the trade name "Kraton G-1651") which was unmodified rubber. The results are given in Table 4.

EXAMPLE 28

The procedure in Example 27 was repeated except that the blend composition was altered as given in Table 4. The results are given in Table 4.

EXAMPLES 28A & 28B

The procedure in Example 28 was repeated except that a half of the maleic anhydride-modified SEBS (produced by Asahi Chemical Industry Co., Ltd. under the trade name "MX-072") was replaced with MASS of core shell type (produced by Mitsubishi Rayon Co., Ltd. under the trade name "S-2001") which was unmodified rubber. The results are given in Table 4.

EXAMPLE 28C

The procedure in Example 28 was repeated except that a half of the maleic anhydride-modified SEBS (produced by Asahi Chemical Industry Co., Ltd. under the trade name "MX-072") was replaced with SEBS (produced by Shell Kagaku K.K. under the trade name "Kraton G-1651") which was unmodified rubber. The results are given in Table 4.

EXAMPLE 29

The procedure in Example 27 was repeated except that the blend composition was altered as given in Table 4. The results are given in Table 4.

EXAMPLE 29A

The procedure in Example 29 was repeated except that a half of the maleic anhydride-modified SEBS (produced by Asahi Chemical Industry Co., Ltd. under the trade name "MX-072") was replaced with MASS of core shell type (produced by Mitsubishi Rayon Co., Ltd. under the trade name "S-2001") which was unmodified rubber. The results are given in Table 4.

Table 29B

The procedure in Example 29 was repeated except that a half of the maleic anhydride-modified SEBS (produced by Asahi Chemical Industry Co., Ltd. under the trade name "MX-072") was replaced with SEBS (produced by Shell Kagaku K.K. under the trade name "Kraton G-1651") which was unmodified rubber. The results are given in Table 4.

EXAMPLE 30

The procedure in Example 24 was repeated except that 22.2% by weight of the maleic anhydride-modified SPS in Preparation Example 3 was used as the component (a-4). The results are given in Table 4.

Comparative Examples 37 & 38

The procedure in Example 24 was repeated except that SPS and polyamide were used in an amount of 100% by weight, respectively. The results are given in Table 4.

Comparative Example 39 to 41

The procedure in Example 24 was repeated except that a compatibilizer as the component (d-1) was not incorporated and that the blend composition was altered as given in Table 3. The results are given in Table 4.

Comparative Examples 42 to 47

The procedure in Example 24 or 27 was repeated except that a rubbery elastomer as the component (c-3) was not incorporated and that the blend composition was altered as given in Table 4. The results are given in Table 4.

Comparative Example 48

The procedure in Example 30 was repeated except that a rubbery elastomer as the component (c-4) was not incorporated and that the blend composition was altered as given in Table 4. The results are given in Table 4.

TABLE 4-1

| Example and Comp. | Blending Resin (100 parts by weight) | | | (b) Polyamide 2015B | (c-3)(c-4) Rubber MX-072 |
|---|---|---|---|---|---|
| | (a-1), (a-2) SPS Preparation Example (wt %) | | | | |
| Example | 1 | 3 | 3A | (wt %) | (wt %) |
| Example 24 | 22.2 | — | — | 70.0 | 6.0 |
| Example 25 | 37.0 | — | — | 50.0 | 10.0 |

TABLE 4-1-continued

| Example and Comp. Example | (a-1), (a-2) SPS Preparation Example (wt %) | | | (b) Polyamide 2015B (wt %) | (c-3)(c-4) Rubber MX-072 (wt %) |
|---|---|---|---|---|---|
| | 1 | 3 | 3A | | |
| Example 26 | 77.0 | — | — | 10.0 | 10.0 |
| Example 27 | 22.2 | — | — | 70.0 | 6.0 |
| Example 28 | 37.0 | — | — | 50.0 | 10.0 |
| Example 29 | 77.0 | — | — | 10.0 | 10.0 |
| Example 30 | — | 24.0 | — | 70.0 | 6.0 |
| Example 43 | — | — | 24.0 | 70.0 | 6.0 |
| Example 44 | 22.2 | — | — | 70.0 | 6.0 |
| Example 45 | 37.0 | — | — | 50.0 | 10.0 |
| Example 46 | 77.0 | — | — | 10.0 | 10.0 |
| Comp. Example 37 | 100.0 | — | — | — | — |
| Comp. Example 38 | — | — | — | 100.0 | — |
| Comp. Example 39 | 24.0 | — | — | 70.0 | 6.0 |
| Comp. Example 40 | 40.0 | — | — | 50.0 | 10.0 |
| Comp. Example 41 | 80.0 | — | — | 10.0 | 10.0 |
| Comp. Example 42 | 28.2 | — | — | 70.0 | — |
| Comp. Example 43 | 47.0 | — | — | 50.0 | — |
| Comp. Example 44 | 87.0 | — | — | 10.0 | — |
| Comp. Example 45 | 28.2 | — | — | 70.0 | — |
| Comp. Example 46 | 47.0 | — | — | 50.0 | — |
| Comp. Example 47 | 87.0 | — | — | 10.0 | — |
| Comp. Example 48 | — | 30.0 | — | 70.0 | — |
| Comp. Example 61 | 7.2 | — | — | 85.0 | 6.0 |
| Comp. Example 62 | 89.2 | — | — | 3.0 | 6.0 |
| Comp. Example 63 | 2.0 | — | — | 85.0 | 10.0 |
| Comp. Example 64 | 84.0 | — | — | 3.0 | 10.0 |
| Comp. Example 65 | 2.0 | — | — | 85.0 | 10.0 |
| Comp. Example 66 | 84.0 | — | — | 3.0 | 10.0 |

TABLE 4-2

| Example and Comp. Example | Blending Resin (100 parts by weight) (d-1), (d-2) Compatibilizer Preparation Example (wt %) | | | Filler (e) Glas fiber (parts by weight) |
|---|---|---|---|---|
| | 3 | 3A | 4 | |
| Example 24 | 1.8 | — | — | 43.0 |
| Example 25 | 3.0 | — | — | 43.0 |
| Example 26 | 3.0 | — | — | 43.0 |
| Example 27 | — | — | 1.8 | 43.0 |
| Example 28 | — | — | 3.0 | 43.0 |
| Example 29 | — | — | 3.0 | 43.0 |
| Example 30 | — | — | — | 43.0 |
| Example 43 | — | — | — | 43.0 |
| Example 44 | — | 1.8 | — | 43.0 |
| Example 45 | — | 3.0 | — | 43.0 |
| Example 46 | — | 3.0 | — | 43.0 |
| Comp. Example 37 | — | — | — | 43.0 |
| Comp. Example 38 | — | — | — | 43.0 |
| Comp. Example 39 | — | — | — | 43.0 |
| Comp. Example 40 | — | — | — | 43.0 |
| Comp. Example 41 | — | — | — | 43.0 |
| Comp. Example 42 | 1.8 | — | — | 43.0 |
| Comp. Example 43 | 3.0 | — | — | 43.0 |
| Comp. Example 44 | 3.0 | — | — | 43.0 |
| Comp. Example 45 | — | — | 1.8 | 43.0 |
| Comp. Example 46 | — | — | 3.0 | 43.0 |
| Comp. Example 47 | — | — | 3.0 | 43.0 |
| Comp. Example 48 | 1.8 | — | — | 43.0 |
| Comp. Example 61 | 1.8 | — | — | 43.0 |
| Comp. Example 62 | — | — | 3.0 | 43.0 |
| Comp. Example 63 | — | — | 3.0 | 43.0 |
| Comp. Example 64 | — | 3.0 | — | 43.0 |
| Comp. Example 65 | — | 3.0 | — | 43.0 |
| Comp. Example 66 | | | | |

TABLE 4-3

| Example and Comp. Example | Physical properties after conditioning After 24 Hrs at 23° C., 50% humidity | | | | Water absorption and physical properties after absorption of water After 24 Hrs in water at 23° C. | |
|---|---|---|---|---|---|---|
| | Izod impact strength (kJ/m$^2$) | Elongation (%) | Flexural modulus of elasticity (MPa) | Heat distortion temperature (°C.) | Water absorption (%) | Flexural modulus of elasticity (MPa) |
| Example 24 | 14.5 | 3.8 | 9090 | 237 | 0.50 | 6800 |
| Example 25 | 13.0 | 3.5 | 9620 | 226 | 0.41 | 7420 |
| Example 26 | 11.9 | 2.6 | 9950 | 212 | 0.10 | 9650 |
| Example 27 | 14.8 | 3.9 | 9050 | 248 | 0.49 | 6540 |
| Example 28 | 13.4 | 3.4 | 9610 | 241 | 0.39 | 7300 |
| Example 29 | 12.1 | 2.5 | 9840 | 238 | 0.08 | 9650 |
| Example 30 | 14.8 | 3.9 | 9100 | 202 | 0.58 | 6870 |
| Example 43 | 15.4 | 4.1 | 9420 | 208 | 0.04 | 10480 |
| Example 44 | 14.8 | 3.9 | 9410 | 236 | 0.48 | 7640 |
| Example 45 | 12.9 | 3.5 | 9520 | 225 | 0.41 | 7340 |
| Example 46 | 12.1 | 2.6 | 10090 | 213 | 0.10 | 9790 |
| Comp. Example 37 | 4.5 | 0.8 | 10310 | 210 | 0.04 | 10220 |
| Comp. Example 38 | 10.1 | 3.5 | 8500 | 250 | 0.71 | 4870 |
| Comp. Example 39 | 7.8 | 2.0 | 8850 | 243 | 0.63 | 5140 |
| Comp. Example 40 | 4.8 | 1.5 | 9010 | 222 | 0.50 | 6280 |
| Comp. Example 41 | 4.0 | 1.2 | 9200 | 200 | 0.21 | 8670 |
| Comp. Example 42 | 9.8 | 2.9 | 9200 | 240 | 0.53 | 7020 |
| Comp. Example 43 | 9.1 | 2.4 | 9730 | 234 | 0.44 | 7740 |
| Comp. Example 44 | 6.9 | 1.1 | 10250 | 225 | 0.12 | 9860 |
| Comp. Example 45 | 9.3 | 3.0 | 9250 | 251 | 0.55 | 6990 |
| Comp. Example 46 | 8.6 | 2.6 | 9910 | 245 | 0.41 | 7540 |
| Comp. Example 47 | 7.4 | 1.5 | 10100 | 248 | 0.10 | 9900 |
| Comp. Example 48 | 9.5 | 3.0 | 9330 | 211 | 0.60 | 7210 |
| Comp. Example 61 | 9.1 | 3.1 | 8710 | 241 | 0.91 | 5100 |
| Comp. Example 62 | 6.9 | 0.9 | 9910 | 224 | 0.02 | 9020 |
| Comp. Example 63 | 9.0 | 2.8 | 8650 | 248 | 0.93 | 4800 |
| Comp. Example 64 | 7.7 | 1.0 | 10080 | 250 | 0.03 | 8980 |
| Comp. Example 65 | 9.3 | 2.9 | 8580 | 241 | 0.91 | 5050 |
| Comp. Example 66 | 6.9 | 1.1 | 10710 | 230 | 0.02 | 9000 |

TABLE 4-4

| | Blending | | | | | |
|---|---|---|---|---|---|---|
| | Resin (100 parts by weight) | | | | | |
| | (a-1), (a-2) | | (c-3), (c-4) | | (d-1), (d-2) | Filler |
| Example and Comp. Example | SPS Preparation Example 1 (wt %) | (b) Polyamide 2015B (wt %) | Rubber MX-072 (wt %) | Rubber used in combination S-2001 or G-1651 (wt %) | Compatibilizer Modified PPO in Preparation Example 4 (wt %) | (e) Glass fiber (parts by weight) |
| Example 27A | 22.2 | 70.0 | 3.0 | 3.0 (S-2001) | 1.8 | 43 |
| Example 27B | 22.2 | 70.0 | 3.0 | 3.0 (G-1651) | 1.8 | 43 |
| Example 28A | 37.0 | 50.0 | 5.0 | 5.0 (S-2001) | 3.0 | 43 |
| Example 28B | 37.0 | 50.0 | 5.0 | 5.0 (S-2001) | 3.0* | 43 |
| Example 28C | 37.0 | 50.0 | 5.0 | 5.0 (G-1651) | 3.0 | 43 |

TABLE 4-4-continued

| | Blending | | | | |
|---|---|---|---|---|---|
| | Resin (100 parts by weight) | | | | |
| | (a-1), (a-2) | (b) | (c-3), (c-4) | | (d-1), (d-2) | Filler |
| Example and Comp. Example | SPS Preparation Example 1 (wt %) | Polyamide 2015B (wt %) | Rubber MX-072 (wt %) | Rubber used in combination S-2001 or G-1651 (wt %) | Compatibilizer Modified PPO in Preparation Example 4 (wt %) | (e) Glass fiber (parts by weight) |
| Example 29A | 77.0 | 10.0 | 5.0 | 5.0 (S-2001) | 3.0 | 43 |
| Example 29B | 77.0 | 10.0 | 5.0 | 5.0 (G-1651) | 3.0 | 43 |

(Note) *Maleic acid-modified SPS as obtained in Preparation Example 3 was used in place of modified PPO.

TABLE 4-5

| | Physical properties after conditioning After 24 Hrs at 23° C., 50% humidity | | | | Water absorption and physical properties after absorption of water After 24 Hrs in water at 23° C. | |
|---|---|---|---|---|---|---|
| Example and Comp. Example | Izod impact strength (kJ/m$^2$) | Elongation (%) | Flexural modulus of elasticity (MPa) | Heat distortion temperature (°C.) | Water absorption (%) | Flexural modulus of elasticity (MPa) |
| Example 27A | 15.2 | 4.2 | 9050 | 295 | 0.46 | 6570 |
| Example 27B | 11.7 | 2.8 | 9790 | 225 | 0.07 | 9680 |
| Example 28A | 13.8 | 3.7 | 9590 | 237 | 9.35 | 7330 |
| Example 28B | 13.5 | 3.6 | 9560 | 230 | 0.38 | 7300 |
| Example 28C | 13.5 | 4.0 | 9020 | 241 | 0.46 | 6550 |
| Example 29A | 12.8 | 2.7 | 9800 | 235 | 0.07 | 9680 |
| Example 29B | 12.4 | 3.7 | 9590 | 234 | 0.37 | 7330 |

As is clear from Table 4 it is possible, according to the present invention, to obtain a heat resistant and water resistant resin composition markedly improved in impact strength and elongation as compared with the resin composition blended in the component (b) only with the components (a-1) and (c-3) or the components (a-1) and (d-1) or the component (a-2).

EXAMPLE 31

The procedure in Example 1 was repeated except that 1.8% by weight of the maleic anhydride-modified SPS in Preparation Example 3A was used as a compatibilizer in the component (d-1). The results are given in Table 1.

EXAMPLE 32

The procedure in Example 2 was repeated except that 3.0% by weight of the maleic anhydride-modified SPS in Preparation Example 3A was used as a compatibilizer in the component (d-1). The results are given in Table 1.

EXAMPLE 33

The procedure in Example 3 was repeated except that 3.0% by weight of the maleic anhydride-modified SPS in Preparation Example 3A was used as a compatibilizer in the component (d-1). The results are given in Table 2.

EXAMPLE 33

The procedure in Example 1 was repeated except that 24.0% by weight of the maleic anhydride-modified SPS in Preparation Example 3A was used as the component (a-2) and that neither the component (d-1) nor the component (d-2) was used. The results are given in Table 1.

Comparative Examples 49 & 50

The procedure in Example 1 was repeated except that the blend composition was altered as given in Table 1. The results are given in Table 1.

Comparative Examples 51 & 52

The procedure in Example 5 was repeated except that the blend composition was altered as given in Table 1. The results are given in Table 1.

Comparative Examples 53 & 54

The procedure in Example 32 was repeated except that the blend composition was altered as given in Table 1. The results are given in Table 1.

Comparative Examples 30A & 31A

The procedure in Example 5A was repeated except that the blend composition was altered as given in Table 1. The results are given in Table 1.

EXAMPLE 34

The procedure in Example 9 was repeated except that 1.8% by weight of the maleic anhydride-modified SPS in Preparation Example 3A was used as a compatibilizer in the component (d-1). The results are given in Table 2.

EXAMPLE 35

The procedure in Example 10 was repeated except that 3.0% by weight of the maleic anhydride-modified SPS in Preparation Example 3A was used as a compatibilizer in the component (d-1). The results are given in Table 2.

EXAMPLE 36

The procedure in Example 11 was repeated except that 3.0% by weight of the maleic anhydride-modified SPS in Preparation Example 3A was used as a compatibilizer in the component (d-1). The results are given in Table 2.

EXAMPLE 37

The procedure in Example 9 was repeated except that 24.0% by weight of the maleic anhydride-modified SPS in Preparation Example 3A was used as the component (a-2) and that neither the component (d-1) nor the component (d-2) was used. The results are given in Table 1.

Comparative Examples 32A & 33A

The procedure in Example 13A was repeated except that the blend composition was altered as given in Table 2. The results are given in Table 2.

EXAMPLE 39

The procedure in Example 16 was repeated except that 1.8% by weight of the maleic anhydride-modified SPS in Preparation Example 3a was used as a compatibilizer in the component (d-1). The results are given in Table 3.

EXAMPLE 40

The procedure in Example 17 was repeated except that 3.0% by weight of the maleic anhydride-modified SPS in Preparation Example 3A was used as a compatibilizer in the component (d-1). The results are given in Table 3.

EXAMPLE 41

The procedure in Example 18 was repeated except that 3.0% by weight of the maleic anhydride-modified SPS in Preparation Example 3A was used as a compatibilizer in the component (d-1). The results are given in Table 3.

EXAMPLE 42

The procedure in Example 16 was repeated except that 24.0% by weight of the maleic anhydride-modified SPS in Preparation Example 3A was used as the component (a-2) and that neither the component (d-1) nor the component (d-2) was used. The results are given in Table 3.

Comparative Example 55 & 56

The procedure in Example 16 was repeated except that the blend composition was altered as given in Table 3. The results are given in Table 3.

Comparative Examples 57 & 58

The procedure in Example 20 was repeated except that the blend composition was altered as given in Table 3. The results are given in Table 3.

Comparatives Examples 59–60

The procedure in Example 42 was repeated except that the blend composition was altered as given in Table 3. The results are given in Table 3.

EXAMPLE 43

The procedure in Example 24 was repeated except that 24.0% by weight of the maleic anhydride-modified SPS in Preparation Example 3A was used as the component (a-2) and that neither the component (d-1) nor the component (d-2) was used. The results are given in Table 4.

EXAMPLE 44

The procedure in Example 24 was repeated except that 1.8% by weight of the maleic anhydride-modified SPS in Preparation Example 3A was used as a compatibilizer in the component (d-1). The results are given in Table 4.

EXAMPLE 45

The procedure in Example 25 was repeated except that 3.0% by weight of the maleic anhydride-modified SPS in Preparation Example 3A was used as a compatibilizer in the component (d-1). The results are given in Table 4.

EXAMPLE 46

The procedure in Example 26 was repeated except that 3.0% by weight of the maleic anhydride-modified SPS in Preparation Example 3A was used as a compatibilizer in the component (d-1). The results are given in Table 4.

Comparative Examples 61 & 62

The procedure in Example 24 was repeated except that the blend composition was altered as given in Table 4. The results are given in Table 4.

Comparative Examples 63 & 64

The procedure in Example 28 was repeated except that the blend composition was altered as given in Table 4. The results are given in Table 4.

Comparative Examples 65 & 66

The procedure in Example 45 was repeated except that the blend composition was altered as given in Table 4. The results are given in Table 4.

What is claimed is:

1. A styrenic resin composition which comprises 1 to 95% by weight of a (a-1) styrenic polymer having syndiotactic configuration; 5 to 80% by weight of (b) at least one thermoplastic resin selected from the group consisting of polyester, polyamide and polycarbonate; 1 to 50% by weight of a (c-1) rubbery elastomer having an affinity for said component (a-1); and 0.1 to 10% by weight of a (d-1) at least one modified syndiotactic polystyrene or modified polyphenyleneoxide compatibilizer which is compatible with said component (a-1) and which has a polar group capable of reacting with said component (b).

2. The styrenic resin composition according to claim 1 which further comprises one (1) to 350 parts by weight of an (e) inorganic filler based on 100 parts by weight of the styrenic resin composition as set forth in claim 1.

3. The styrenic resin composition according to claim 1 wherein said rubbery elastomer as the component (c-1) comprises 5 to 95% by weight of a core shell rubber.

4. A styrenic resin composition which comprises 1 to 95% by weight of (a-2) modified styrenic polymer which has syndiotactic configuration and has a polar group capable of reacting with said component (b); 5 to 80% by weight of (b) at least one thermoplastic resin selected from the group consisting of polyester, polyamide and polycarbonate; and 1 to 50% by weight of a (c-2) rubbery elastomer having an affinity for said component (a-2).

5. The styrenic resin composition according to claim 4 which further comprises one (1) to 350 parts by weight of an (e) inorganic filler based on 100 parts by weight of the styrenic resin composition as set forth in claim 4.

6. The styrenic resin composition according to claim 4 wherein said rubbery elastomer as the component (c-2) comprises 5 to 95% by weight of a core shell rubber.

7. The styrenic resin composition according to claim 4 which further comprises 0.1 to 10% by weight of a (d-2) modified polyphenyleneoxide compatibilizer which is compatible with said component (a-2) and which has a polar group capable of reacting with said component (b).

8. The styrenic resin composition according to claim 7 which further comprises one (1) to 350 parts by weight of an (e) inorganic filler based on 100 parts by weight of the styrenic resin composition as set forth in claim 7.

9. The styrenic resin composition according to claim 7 wherein said rubbery elastomer as the component (c-2) comprises 5 to 95% by weight of a core shell rubber.

10. A styrenic resin composition which comprises 1 to 95% by weight of a (a-1) styrenic polymer having syndiotactic configuration; 1 to 95% by weight of (b) at least one polyester, polyamide or polycarbonate thermoplastic resin; 1 to 50% by weight of a (c-3) rubbery elastomer which has a polar group capable of reacting with said component (b) and has a portion compatibilizable with said component (a-1); and 0.1 to 10% by weight of a (d-1) at least one modified syndiotactic polystyrene or modified polyphenyleneoxide compatibilizer which is compatible with said component (a-1) and which has a polar group capable of reacting with said component (b).

11. The styrenic resin composition according to claim 10 which further comprises one (1) to 350 parts by weight of an (e) inorganic filler based on 100 parts by weight of the styrenic resin composition as set forth in claim 10.

12. The styrenic resin composition according to claim 10 wherein said rubbery elastomer as the component (c-3) comprises 5 to 95% by weight of a core shell rubber.

13. A styrenic resin composition which comprises to 1 to 95% by weight of a (a-2) modified styrenic polymer which has a syndiotactic configuration and has a polar group capable of reacting with said component (b); 1 to 95% by weight of (b) at least one polyester, polyamide or polycarbonate thermoplastic resin; 1 to 50% by weight of (c-4) rubbery elastomer which has a polar group capable of reacting with said component (b) and has also an affinity for said component (a-2).

14. The styrenic resin composition according to claim 13 which further comprises one (1) to 350 parts by weight of an (e) inorganic filler based on 100 parts by weight of the styrenic resin composition as set forth in claim 13.

15. The styrenic resin composition according to claim 13 wherein said rubbery elastomer as the component (c-4) comprises 5 to 95% by weight of a core shell rubber.

16. The styrenic resin composition according to claim 13 which further comprises 0.1 to 10% by weight of (d-2) a modified polyphenyleneoxide compatibilizer which is compatible with said component (a-2) and which has a polar group capable of reacting with said component (b).

17. The styrenic resin composition according to claim 16 which further comprises one (1) to 350 parts by weight of an (e) inorganic filler based on 100 parts by weight of the styrenic resin composition as set forth in claim 16.

18. The styrenic resin. composition according to claim 16 wherein said rubbery elastomer as the component (c-4) comprises 5 to 95% by weight of a core shell rubber.

19. The styrenic resin composition according to claim 1, wherein said rubbery elastomer component (c-1) is a member selected from the group consisting of styrene/butyl acrylate copolymer, styrene/butadiene (SBR) block copolymer, hydrogenated styrene/butadiene (SEB) block copolymer, styrene/butadiene/styrene (SBS) block copolymer, hydrogenated styrene/butadiene/styrene (SEBS) block copolymer, styrene/isoprene (SIR) block copolymer, hydrogenated styrene/isoprene (SEP) block copolymer, styrene/isoprene/styrene (SIS) block copolymer, hydrogenated styrene/isoprene/styrene (SEPS) block copolymer, styrene/butadiene random copolymer, hydrogenated styrene/butadiene random copolymer, styrene/ethylene/propylene random copolymer, and styrene/ethylene/butylene random copolymer, or a core shell powdery elastomer selected from the group consisting of butadiene/acrylonitrile/styrene (ABS) core shell rubber, methyl methacrylate/butadiene/styrene (ABS) core shell rubber, methyl methacrylate/butylacrylate/styrene (MAS) core shell rubber, octyl acrylate/butadiene/styrene (MABS) core shell rubber, alkyl acrylate/butadiene/acrylonitrile/styrene (AABS) core shell rubber and butadiene/styrene (SBR) core shell rubber.

20. The styrenic resin composition according to claim 4, wherein said rubbery elastomer component (c-2) is a member selected from the group consisting of styrene/butyl acrylate copolymer, styrene/butadiene (SBR) block copolymer, hydrogenated styrene/butadiene (SEB) block copolymer, styrene/butadiene/styrene (SBS) block copolymer, hydrogenated styrene/butadiene/styrene (SEBS) block copolymer, styrene/isoprene (SIR) block copolymer, hydrogenated styrene/isoprene (SEP) block copolymer, styrene/isoprene/styrene (SIS) block copolymer, hydrogenated styrene/isoprene/styrene (SEPS) block copolymer, styrene/butadiene random copolymer, hydrogenated styrene/butadiene random copolymer, styrene/ethylene/propylene random copolymer, and styrene/ethylene/butylene random copolymer, or a core shell powdery elastomer selected from the group consisting of butadiene/acrylonitrile/styrene (ABS) core shell rubber, methyl methacrylate/butadiene/styrene (MBS) core shell rubber, methyl methacrylate/butylacrylate/styrene (MAS) core shell rubber, octyl acrylate/butadiene/styrene (MABS) core shell rubber, alkyl acrylate/butadiene/acrylonitrile/styrene (AABS) core shell rubber and butadiene/styrene (SBR) core shell rubber.

21. The styrenic resin composition according to claim 10, wherein said rubbery elastomer (c-3) is a member selected from the group consisting of styrene/butyl acrylate copolymer, styrene/butadiene (SBR) block copolymer, hydrogenated styrene/butadiene (SEB) block copolymer, styrene/butadiene/styrene (SBS) block copolymer, hydrogenated styrene/butadiene/styrene (SEBS) block copolymer, styrene/isoprene (SIR) block copolymer, hydrogenated styrene/isoprene (SEP) block copolymer, styrene/isoprene/styrene (SIS) block copolymer, hydrogenated styrene/isoprene/styrene (SEPS) block copolymer, styrene/butadiene random copolymer, hydrogenated styrene/butadiene random copolymer, styrene/ethylene/propylene random copolymer, and styrene/ethylene/butylene random copolymer.

22. The styrenic resin composition according to claim 13, wherein said rubbery elastomer (c-4) is a member selected from the group consisting of styrene/butyl acrylate copolymer, styrene/butadiene (SBR) block copolymer, hydrogenated styrene/butadiene (SEB) block copolymer, styrene/butadiene/styrene (SBS) block copolymer, hydrogenated styrene/butadiene/styrene (SEBS) block copolymer, styrene/isoprene (SIR) block copolymer, hydrogenated styrene/isoprene (SEP) block copolymer, styrene/isoprene/ styrene (SIS) block copolymer, hydrogenated styrene/ isoprene/styrene (SEPS) block copolymer, styrene/ butadiene random copolymer, hydrogenated styrene/ butadiene random copolymer, styrene/ethylene/propylene random copolymer, and styrene/ethylene/butylene random copolymer.

* * * * *